US011830137B2

(12) United States Patent
Stevens et al.

(10) Patent No.: US 11,830,137 B2
(45) Date of Patent: Nov. 28, 2023

(54) AUTOMATED THREE-DIMENSIONAL BUILDING MODEL ESTIMATION

(71) Applicant: Aurora Solar Inc., San Francisco, CA (US)

(72) Inventors: Matthew John Stevens, Boston, MA (US); Ganesh Nunnagoppula, San Francisco, CA (US); Maxwell Siegelman, San Francisco, CA (US); Adriel Anhao Luo, San Rafael, CA (US)

(73) Assignee: Aurora Solar Inc., San Francisco, CA (US)

( * ) Notice: Subject to any disclaimer, the term of this patent is extended or adjusted under 35 U.S.C. 154(b) by 0 days.

(21) Appl. No.: 17/187,685

(22) Filed: Feb. 26, 2021

(65) Prior Publication Data
US 2021/0272358 A1 Sep. 2, 2021

Related U.S. Application Data

(60) Provisional application No. 62/983,509, filed on Feb. 28, 2020.

(51) Int. Cl.
*G06T 17/10* (2006.01)
*G06T 17/20* (2006.01)
(Continued)

(52) U.S. Cl.
CPC ............ *G06T 17/10* (2013.01); *G06N 3/08* (2013.01); *G06T 3/0081* (2013.01); *G06T 7/10* (2017.01);
(Continued)

(58) Field of Classification Search
None
See application file for complete search history.

(56) References Cited

U.S. PATENT DOCUMENTS 10,366,287 B1 * 7/2019 Loveland ............. G01J 1/44
10,754,999 B1 * 8/2020 Vratimos ............. G06N 3/08
(Continued)

FOREIGN PATENT DOCUMENTS

WO  WO 2017035398  3/2017
WO  WO2017035938  3/2017

OTHER PUBLICATIONS

Khosravipour, Anahita, Andrew K. Skidmore, Martin Isenburg. Generating spike-free digital surface models using LiDAR raw pointclouds: A new approach for forestry applications. Jun. 15, 2016. International Journal of Applied Earth Observation and Geoinformation 52 (2016). p. 104-114. (Year: 2016).*
(Continued)

*Primary Examiner* — Aaron M Richer
(74) *Attorney, Agent, or Firm* — Fish & Richardson P.C.

(57) ABSTRACT

Automated three-dimensional (3D) building model estimation is disclosed. In an embodiment, a method comprises: obtaining, using one or more processors, an aerial image of a building based on an input address; obtaining, using the one or more processors, three-dimensional (3D) data containing the building based on the input address; pre-processing the aerial image and 3D data; reconstructing, using the one or more processors, a 3D building model from the pre-processed image and 3D data, the reconstructing including: predicting, using instance segmentation, a mask for each roof face; converting each roof face into a two-dimensional (2D) polygon; and projecting each 2D polygon into a 3D polygon representing the 3D building model.

20 Claims, 22 Drawing Sheets

(51) Int. Cl.
*G06T 7/10* (2017.01)
*G06N 3/08* (2023.01)
*G06T 7/35* (2017.01)
*G06V 20/10* (2022.01)
*G06T 3/00* (2006.01)

(52) U.S. Cl.
CPC ............. *G06T 7/35* (2017.01); *G06T 17/20* (2013.01); *G06V 20/176* (2022.01); *G06T 2207/10032* (2013.01); *G06T 2210/22* (2013.01)

(56) References Cited

U.S. PATENT DOCUMENTS

| | | | |
|---|---|---|---|
| 2003/0147553 | A1 | 8/2003 | Chen et al. |
| 2010/0114537 | A1* | 5/2010 | Pershing ............... G06T 11/60 703/1 |
| 2014/0132635 | A1* | 5/2014 | Murdoch ............... G06T 7/62 345/641 |
| 2015/0199455 | A1* | 7/2015 | Loss ..................... G06T 7/11 703/1 |
| 2018/0089833 | A1* | 3/2018 | Lewis ................... G06F 16/532 |
| 2019/0188337 | A1 | 6/2019 | Keane |
| 2019/0279420 | A1 | 9/2019 | Moreno et al. |
| 2019/0384866 | A1* | 12/2019 | Porter ................... G06F 3/04845 |
| 2020/0184233 | A1* | 6/2020 | Berberian ............. G06T 7/74 |
| 2021/0183080 | A1* | 6/2021 | Hoiem .................. G06T 11/203 |
| 2022/0215622 | A1 | 7/2022 | Stevens et al. |

OTHER PUBLICATIONS

Centaur.reading.ac.uk [online], "Urban ground-based thermography", published Jun. 2019, retrieved on Apr. 20, 2021, retrieved from URL<http://centaur.reading.ac.uk/89043/1/23867657_Morrison_thesis.PDF>, 183 pages.

PCT International Search Report and Written Opinion in International Appln. No. PCT/US2021/20090, dated May 24, 2021, 8 pages.

Researchgate.com [online], "2D Image-To-3D Model: Knowledge-Based 3D Building Reconstruction (3DBR) Using Single Aerial Images and Convolutional Neural Networks (CNNs)", published on Sep. 23, 2019, retrieved on Apr. 19, 2021, retrieved from URL<https://www.researchgate.net/publication/335997932_2D_Image-To-3D_Model_Knowledge-Based3D=Building_Reconstruction_3DBR_Using_Single_Aerialimages_and_Convolutional_NeuratrwNoerks_CNNs>, 25 pages.

Ri.Cmu.Edu [online], "Data-Driven Geometric Scene Understanding", published Jul. 2019, retrieved on Apr. 20, 2021, retrieved from URL<https://www.ri.cmu.edu/pub_files/2013/8/dissertation.pdf>, 115 pages.

Briechle et al., "Template matching using fast normalized cross correlation," Optical Pattern Recognition XII, 4387, International Society for Optics and Photonics, Mar. 2001, pp. 95-102.

Chen et al., "Encoder-Decoder with Atrous Separable Convolution for Semantic Image Segmentation," European Conference on Computer Vision, ECCV 2018, pp. 833-851.

Cook, "Stochastic Sampling in Computer Graphics," ACM transactions on Graphics, Jan. 1986, 5(1):51-72.

He et al., "Mask R-CNN," Proceedings of the IEEE International Conference on Computer Vision, 2017, pp. 2961-21969.

Nan et al., "Polyfit: Polygonal surface reconstruction from point clouds," Proceedings of the IEEE International Conference on Computer Vision, Oct. 2017, pp. 2372-2380.

Neven et al., "Instance Segmentation by Jointly Optimizing Spatial Embeddings and Clustering Bandwidth," IEEE/CVF Conference on Computer Vision and Pattern Recognition (CVPR), Jun. 2019, pp. 8837-8845.

Schroff et al., "FaceNet: A Unified Embedding for Face Recognition and Clustering," IEEE Conference on Computer Vision and Pattern Recognition (CVPR), Jun. 2015, pp. 815-823.

Srivastava et al., "Joint height estimation and semantic labeling of monocular aerial images with CNNs," IEEE International Geoscience and Remote Sensing Symposium (IGARSS), Jul. 2017, pp. 5173-5176.

Yang et al., "Plane detection in point cloud data," Proceedings of the 2nd int conf on machine control guidance, Bonn, 2010, 16 pages.

Zagoruyko et al., "Learning to Compare Image Patches via Convolutional Neural Networks," IEEE Conference on Computer Vision and Pattern Recognition (CVPR), Apr. 2015, 9 pages.

PCT International Preliminary Report on Patentability in International Application No. PCT/US2021/020090, dated Sep. 9, 2022, 7 pages.

Algarni, "Machine Learning for Improved Detection and Segmentation of Building Boundary," Thesis for the degree of Doctor of Philosophy, Cardiff University, Feb. 2022, 19 pages.

International Search Report and Written Opinion in International Appln. No. PCT/US2023/015664, dated Jul. 20, 2023, 15 pages.

Zhou et al., "End-to-End Wireframe Parsing, " Proceedings of the IEEE/CVF International Conference on Computer Vision (ICCV), 2019, pp. 962-971.

* cited by examiner

501

502

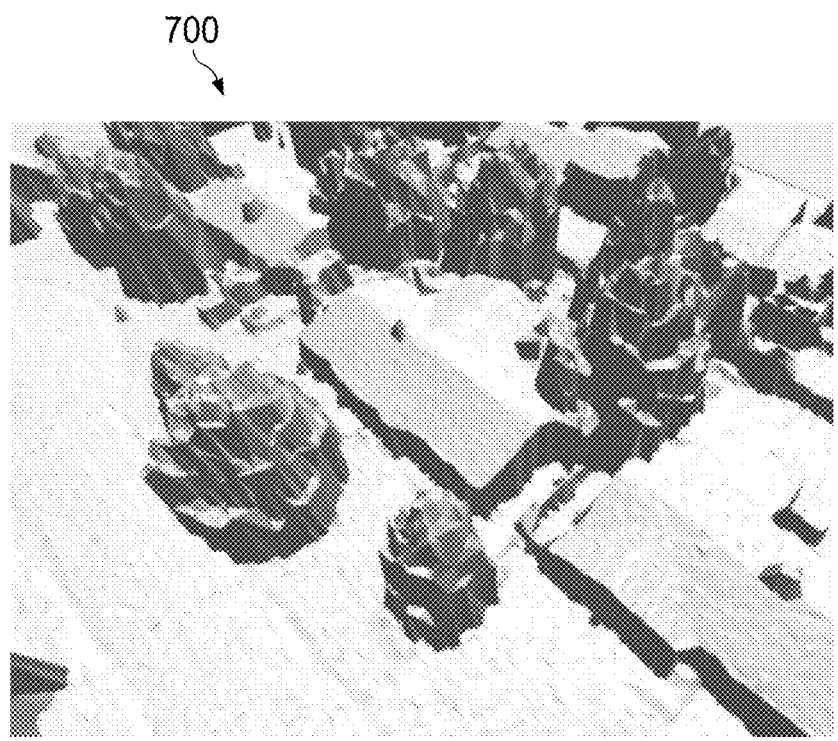
FIG. 7
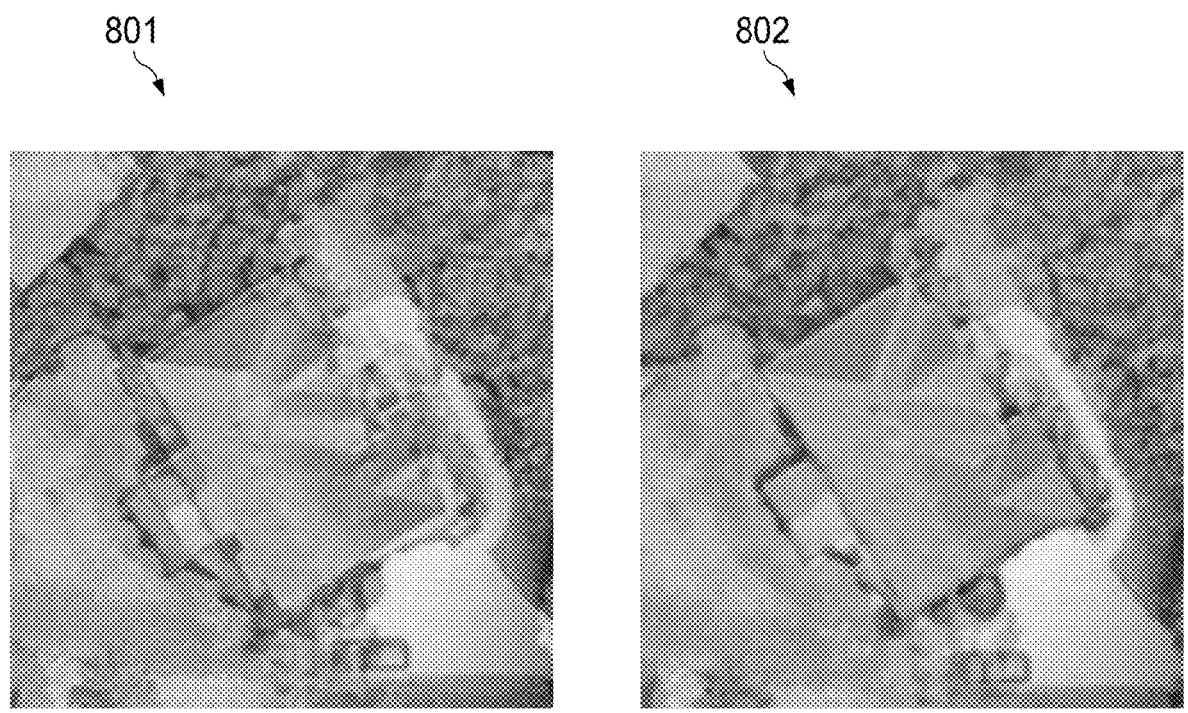
FIG. 8A
FIG. 8B

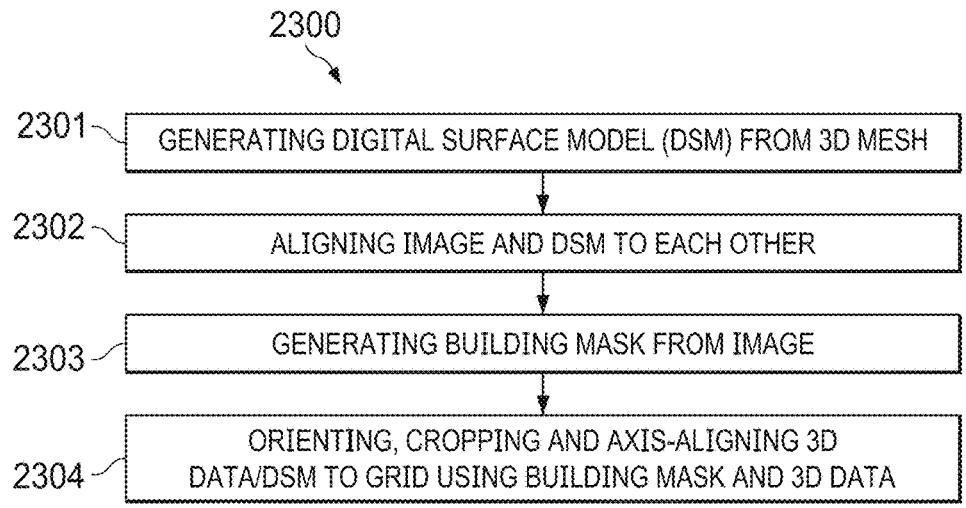
FIG. 23
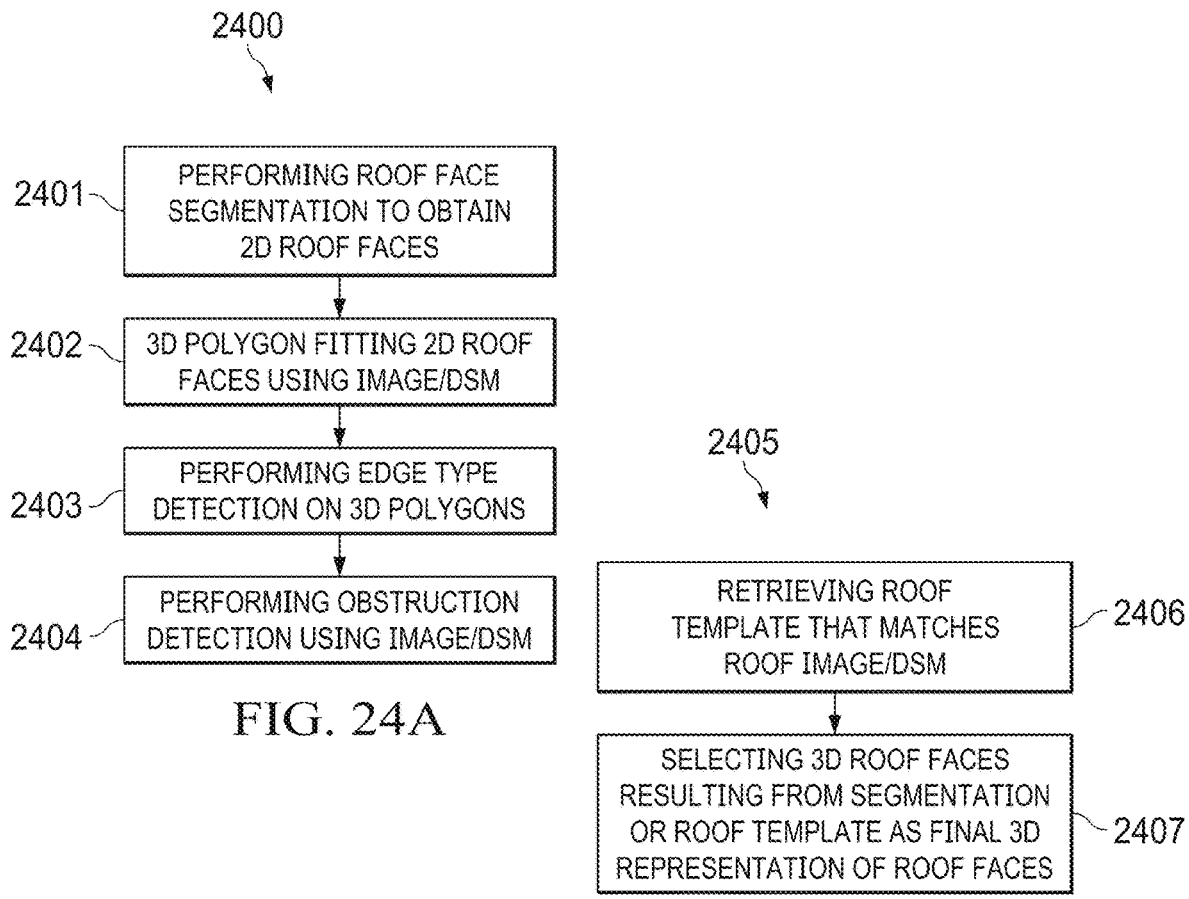
FIG. 24A
FIG. 24B

AUTOMATED THREE-DIMENSIONAL BUILDING MODEL ESTIMATION

CROSS-REFERENCE TO RELATED APPLICATION

This application claims priority to U.S. Provisional Patent Application No. 62/983,509, filed Feb. 28, 2020, the entire contents of which are incorporated herein by reference.

TECHNICAL FIELD

This disclosure relates generally to estimating three-dimensional (3D) building structures, such as roof tops.

BACKGROUND

According to the International Energy Agency solar is the world's fastest growing source of power. Solar energy works by capturing the sun's energy and turning it into electricity for use in a home or business. The sun's energy is captured using solar panels, which are often installed in areas where they can receive maximum exposure to sunlight, such as roofs. A solar panel is comprised of multiple solar cells made of silicon with positive and negative layers which create an electric field. When photons from the sun impact a solar cell, electrons are released from their atoms. By attaching conductors to the positive and negative sides of a solar cell an electrical circuit is formed. When electrons flow through the circuit direct current (DC) is generated, which is converted to alternating current (AC) by an inverter to provide power to the home or office. Excess power is stored in a battery.

The number of solar panels needed for a solar energy system depends on how much energy the building uses, the usable surface area of the roof, the climate and peak sunlight at the location of the building and the wattage and relative efficiency of the solar panels. Multiple solar panels (modules) can be wired together to form a solar array. The peak sunlight hours for the building location impacts the amount of energy the solar array will produce. Also, the size and shape of the roof will impact the solar panel size and number of solar panels used in the solar array. The most popular solar panels are photovoltaic (PV) solar panels that are manufactured in standard sizes of about 65 inches by 39 inches with some variation among manufacturers. The size and shape of the roof will directly impact the size and number of solar panels to be installed. With a large usable roof area, larger panels can be installed at a lower cost per panel. If, however, the usable roof area is limited, or is partially shaded, fewer smaller high efficiency panels may be installed at a higher cost per panel.

There are many different roof types that make solar energy system design complex, including but not limited to: Gable, Hip, Masard, Gambrel, Flat, Skillion, Jerkinhead, Butterfly, Bonnet, Saltbox, Sawtooth, Curved, Pyramid, Dome and any combination of the foregoing. Also, any structures installed on the roof, such as heating, air conditioning and ventilation (HVAC) equipment, chimneys, air vents and the like reduces the usable surface area for solar panel installation.

There are existing software solutions for optimizing solar panel installation that use aerial imagery to estimate the usable surface area of a roof. These techniques, however, will often require substantial user input, making the design process tedious for the user. What is needed is an automated process that requires minimal user input to estimate 3D building structures, and in particular determining with high accuracy the usable area of a 3D roof top model for purposes of designing and simulating a virtual solar energy system that can output performance data that can be used to design an actual solar energy system that achieves the user's target energy savings goal and other user goals.

SUMMARY

Automated three-dimensional (3D) building model estimation is disclosed. In an embodiment, a method comprises: obtaining, using one or more processors, an aerial image of a building based on an input address; obtaining, using the one or more processors, three-dimensional (3D) data containing the building based on the input address; pre-processing the aerial image and 3D data; reconstructing, using the one or more processors, a 3D building model from the pre-processed image and 3D data, the reconstructing including: predicting, using instance segmentation, a mask for each roof face; converting each roof face into a two-dimensional (2D) polygon; and projecting each 2D polygon into a 3D polygon representing the 3D building model.

Other embodiment include but are not limited a system and computer-readable storage medium.

Particular embodiments disclosed herein provide one or more of the following advantages. An automated solar energy system design tool uses aerial imagery, 3D point clouds (e.g., LiDAR point clouds), machine learning (e.g., neural networks) and shading algorithms to estimate the size and shape of a roof of a building and to determine the optimum location of the solar panels to maximize exposure to the sun. The disclosed embodiments are entirely automated and require minimal user input, such as the user's home address, utility rates and the user's average monthly energy bill. The output is an estimated 3D building model that is input into an automated design tool that generates a virtual solar energy system design based on the estimated 3D building model. The virtual solar energy system is automatically simulated to determine its performance including, for example, computing financials for solar production and estimating output power. The automated solar energy system design tool can be accessed by consumers or expert solar panel installers through, for example, the World Wide Web or through an application programming interface (API).

The details of the disclosed embodiments are set forth in the accompanying drawings and the description below. Other features, objects and advantages are apparent from the description, drawings and claims.

DESCRIPTION OF DRAWINGS

FIG. 7 illustrates results of a "spike free" triangulation algorithm applied to the 3D data to generate a 3D mesh, according to an embodiment.

FIGS. 8A and 8B illustrate a registration process whereby the DSM and image are aligned, according to an embodiment.

FIG. 23 is a flow diagram of a pre-processing process for the 3D building estimation process of FIG. 22, according to an embodiment.

FIGS. 24A and 24B are a flow diagram of a reconstruction process for the 3D building estimation process of FIG. 22, according to an embodiment.

The same reference symbol used in various drawings indicates like elements.

INTERPRETATION OF TERMS/FIGURES

Figure 1:
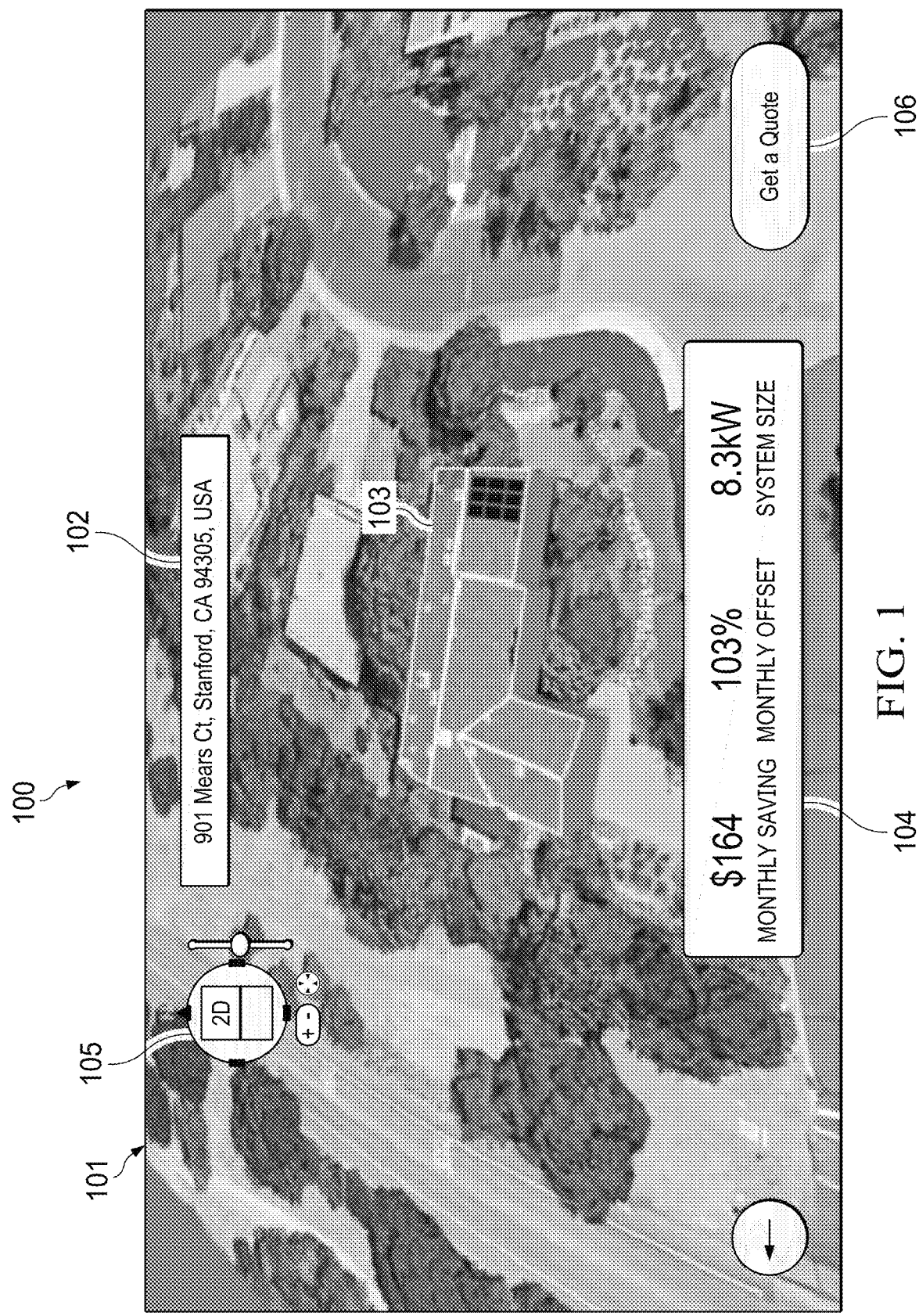
FIG. 1 illustrates a graphical user interface (GUI) of an automated solar energy system design tool, according to an embodiment.

In the following detailed description, for the purposes of explanation, numerous specific details are set forth in order to provide a thorough understanding of the disclosed embodiments. It will be apparent, however, that the disclosed embodiments may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description.

As used herein the term "one or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting.

As used in the description of the various disclosed embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Reference will now be made in detail to the disclosed embodiments, examples of which are illustrated in the accompanying drawings. In the following detailed description, numerous specific details are set forth to provide a thorough understanding of the various described embodiments. However, it will be apparent to one of ordinary skill in the art that the various disclosed embodiments may be practiced without these specific details. In other instances, well-known methods, procedures, components, circuits, and networks have not been described in detail so as not to unnecessarily obscure aspects of the disclosed embodiments.

DETAILED DESCRIPTION

FIG. 1 illustrates a graphical user interface (GUI) 100 of an automated solar energy system design tool, according to an embodiment. In the example shown, GUI 100 includes a 3D image 101 of building 103 with an address that was input by a user in text box 102. A navigation control 105 allows the user to manipulate the viewing perspective of the 3D image (e.g., rotate, tilt). An output pane 104 displays the result of a performance simulation on a solar energy system design that was based on an estimated 3D building model, as described more fully below. In this example, the results include monthly savings in dollars, monthly offset in percentage and system size in kilowatts (kW). A GUI affordance 106 allows a user to request a quote for design and/or installation of the solar system.

Figure 2:
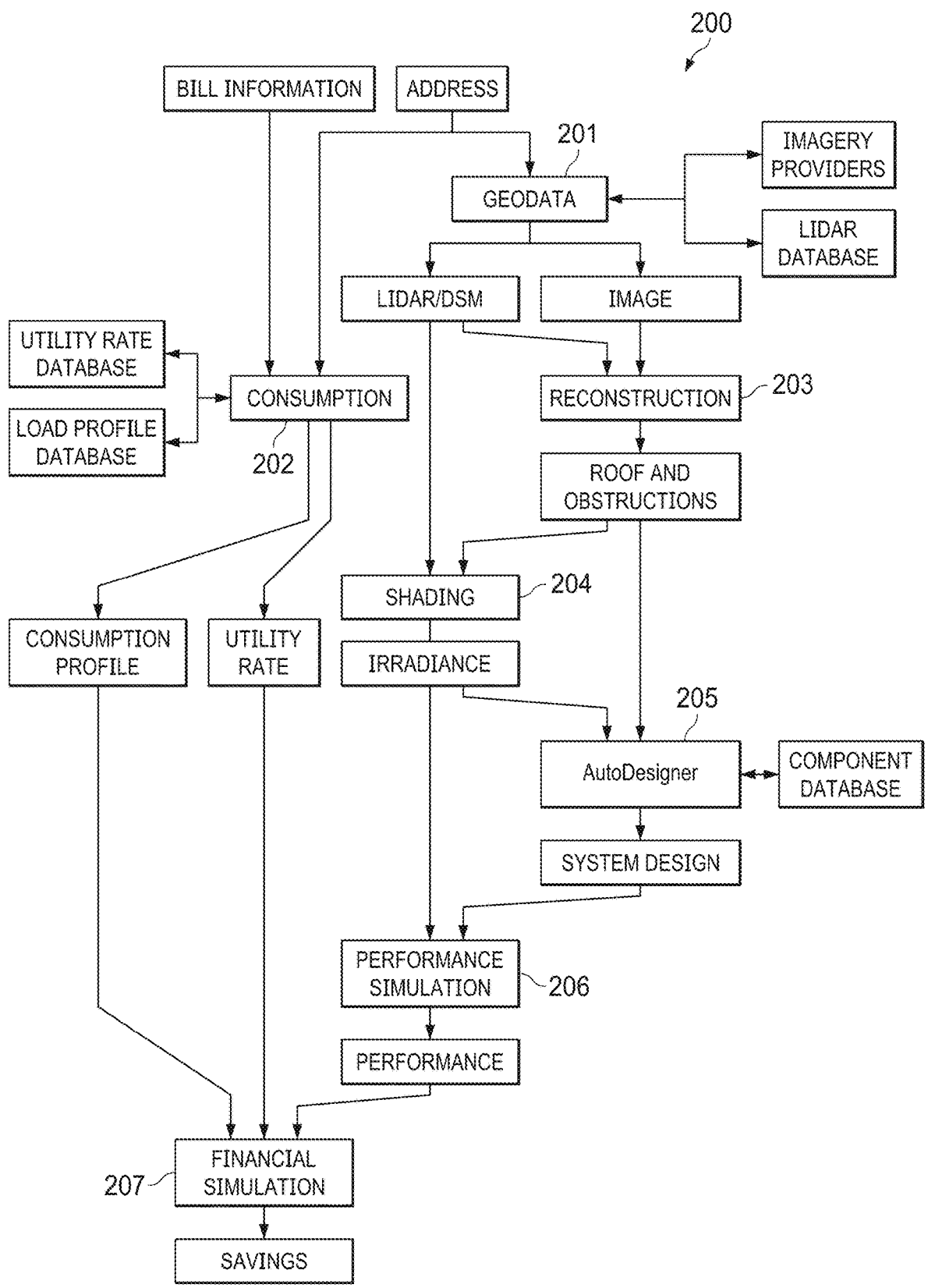
FIG. 2 is a flow diagram of an automated process for estimating 3D building models, according to an embodiment.

FIG. 2 is a flow diagram of an automated process 200 for estimating 3D building models, according to an embodiment. Process 200 begins with a consumption module 202 which gathers various data needed for 3D building estimation, solar energy system design and simulation. Such data includes but is not limited to user input, such as input address of a building, billing information (e.g., the user's average monthly energy costs), utility rates and a consumption profile for the location of the building from a database of consumption profiles. The consumption profile includes energy consumption in kWh for every hour of the year. The utility rate can be looked up in a database. Using the energy consumption and utility rate the system computes the monthly cost of electricity, given hourly usage in kWh.

The input address of the building is used to obtain geodata 201 (e.g., images, 3D data) for the building from a geodatabase, such as the US Geological Survey Geographic Information System (GIS) or a proprietary database. For example, the 3D data can be a point cloud generated by light detection and ranging (LiDAR) sensor or obtained using photogrammetry and synthetic LiDAR. The 3D data can be in the form of a digital surface model (DSM), which is generated by rasterizing the point cloud data to a 2D grid/image so that it can be preprocessed with the 2D image data as described in further detail below. The preprocessed image and DSM is input into reconstruction module 203 which estimates a 3D building model and identifies any roof obstructions. Next, the estimated 3D building module and roof obstructions are input into shading module 204 that uses simulation to determine the amount of exposure the roof has to sunlight. The output of shading module 204 (e.g., irradiance data) is input into automated solar energy system design module 205 which automatically builds a virtual solar energy system based on the estimated 3D building model and shading module output. The virtual solar energy system can then be simulated to determine its performance using simulation module 206.

In a separate processing pipeline, the data output by consumption module 202 (e.g., an energy consumption profile, utility rate) and the performance results (e.g., power output) from simulation module 206 are input into financial simulation 207 used to generate various financial data, including but not limited to monthly savings and offset, as shown in GUI 100 of FIG. 1.

Figure 3:
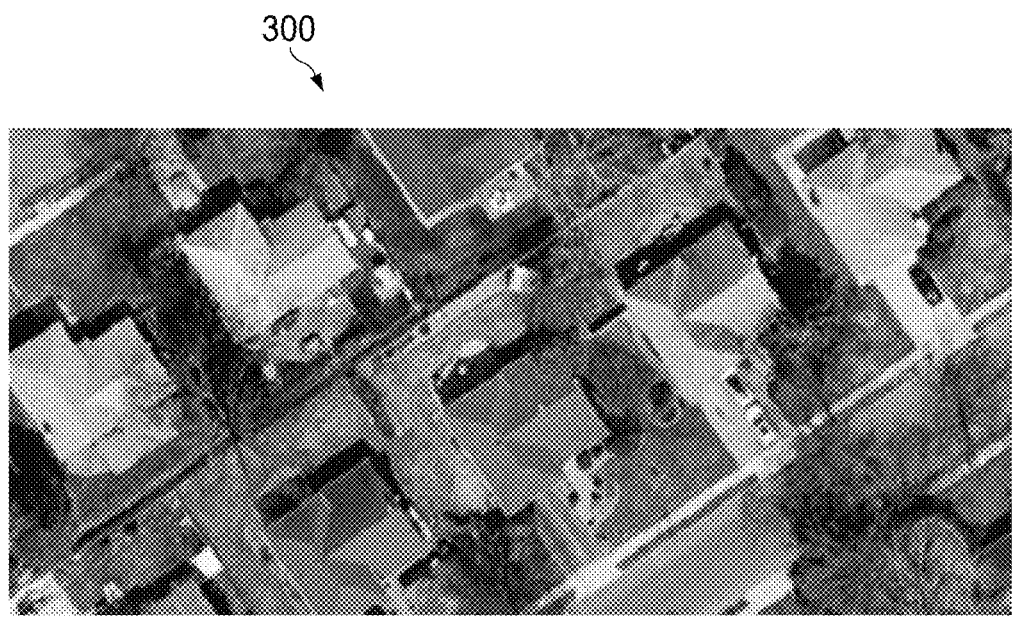
FIG. 3 is an example input image for a preprocessing pipeline, according to an embodiment.

FIG. 3 is an example input image 300 for a preprocessing pipeline, according to an embodiment. The goal of the preprocessing pipeline is to take an arbitrary image and 3D data and convert the image and data to a standard format that is easy for a neural network to handle during reconstruction. Image 300 is a 2D aerial image that can be captured using any suitable modality, including but not limited to fixed-wing aircraft, helicopters, unmanned aerial vehicles (aka "drones"), satellites, balloons, blimps and dirigibles, rockets, pigeons, kites, parachutes, stand-alone telescoping and vehicle- mounted poles. Images for a particular input address can be stored in an indexed database, such as the GIS or a proprietary database.

Figure 4:
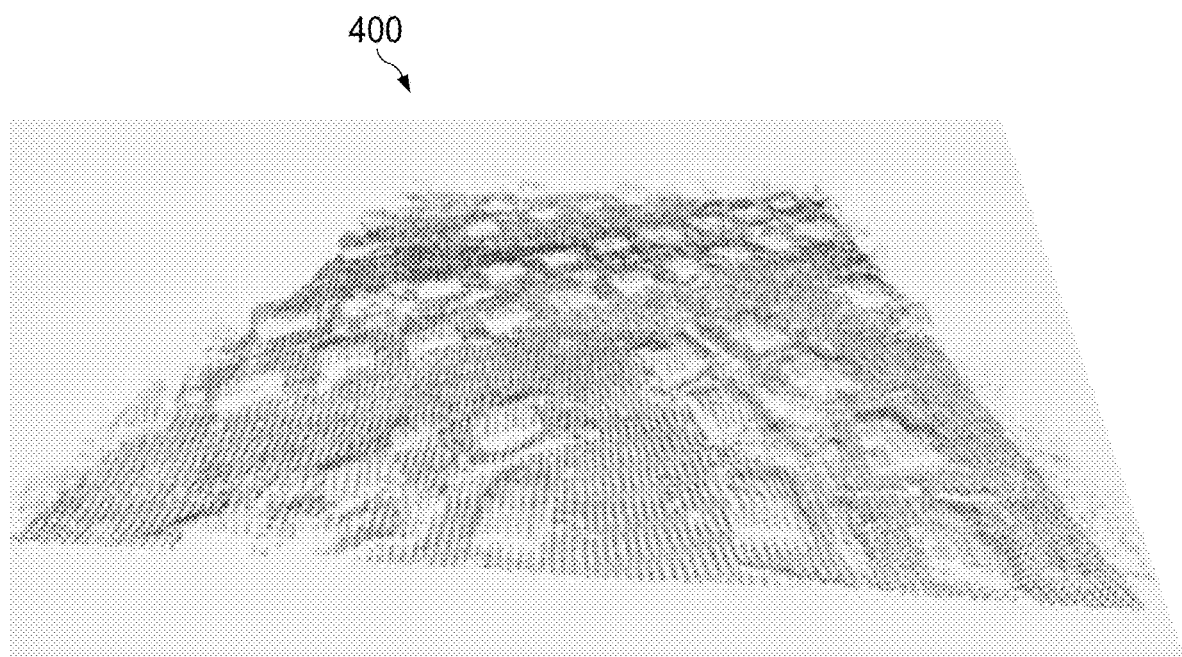
FIG. 4 is an example input 3D data for the preprocessing pipeline, according to an embodiment.

FIG. 4 is an example input 3D data for the preprocessing pipeline, according to an embodiment. The example shown is a LiDAR point cloud, which is a collection of points that represent a 3D shape or feature. In an embodiment, the raw point cloud data can be filtered to remove any outlier points caused by sensor noise before being used for 3D building estimation. Such filtering techniques can be statistical-based, neighborhood-based, projection-based, signal processing based or based on partial differential equations (PDF). Some example filtering techniques include but are not limited to: a voxel grid (VG) filter, normal-based bilateral filter (NBF), moving least square (MLS), weighted locally optimal projection (WLOP), edge aware resample (EAR) and L0 minimization (L0). As previously stated, the LiDAR point cloud can be fitted to a 2D grid to produce a DSM or height map.

Figure 5A:
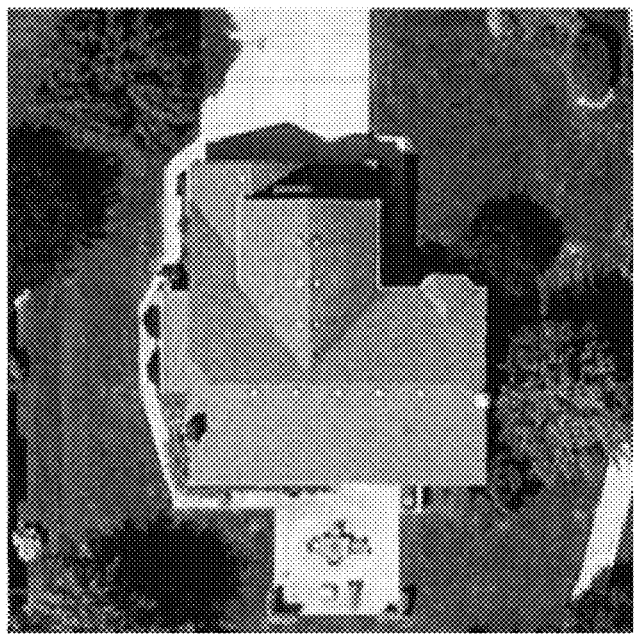
FIGS. 5A and 5B illustrate an example preprocessing output where the image and a DSM derived from 3D data are axis-aligned to a grid, cropped around the building and aligned with each other, according to an embodiment.
Figure 5B:
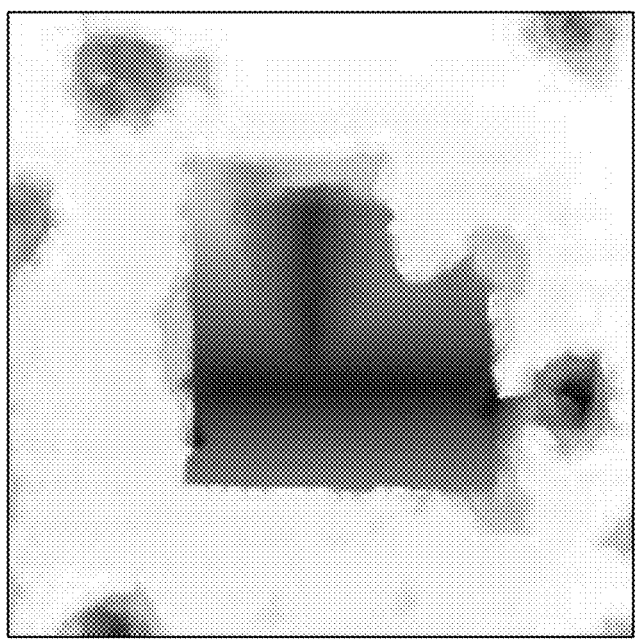

FIGS. 5A and 5B illustrate an example preprocessing output where the image and a DSM derived from 3D data are axis-aligned to a grid, cropped around the building and aligned with each other, according to an embodiment. As shown, a cropped image and DSM of the building are both axis-aligned to a grid and to each other.

Figure 6:
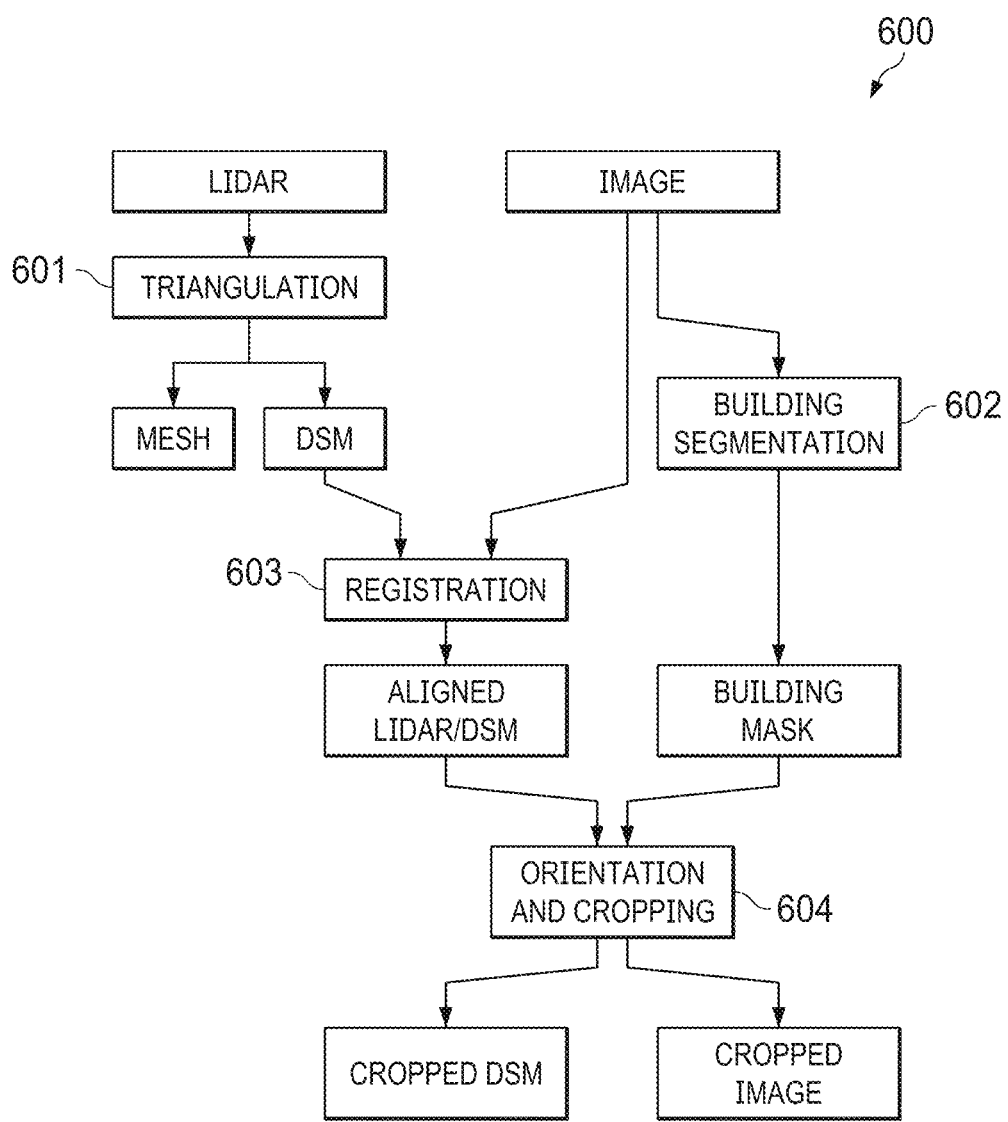
FIG. 6 is a flow diagram of the preprocessing pipeline, according to an embodiment.

FIG. 6 is a flow diagram of preprocessing pipeline 600, according to an embodiment. In a LiDAR preprocessing path of preprocessing pipeline 600, a 3D mesh is generated from the LiDAR data using a "spike free" triangulation method, such as described in Anahita Khosravipour et al. Generating spike-free digital surface models using LiDAR raw point clouds: A new approach for forestry applications. *International Journal of Applied Earth Observation and Geoinformation*, 52:104-114, Jun. 5, 2016.

The term "spike free" refers to the way the method generates smooth meshes for trees. The 3D mesh is rasterized into a DSM or height map/image. Because the image and LiDAR data are not aligned to start with, the LiDAR (height map) and aerial image of the building are input into registration module 602 to align the LiDAR data and aerial image to a grid and to each other. FIG. 7 illustrates the results of the "spike free"triangulation algorithm applied to the 3D LiDAR data to generate a 3D mesh, according to an embodiment. FIGS. 8A and 8B illustrate the registration process whereby the DSM and image are aligned, according to an embodiment.

Figure 10A:
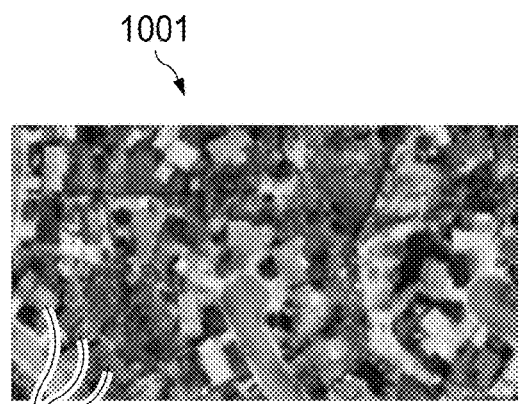
FIGS. 10A and 10B illustrate generating a building mask from an image, according to an embodiment.
Figure 10B:
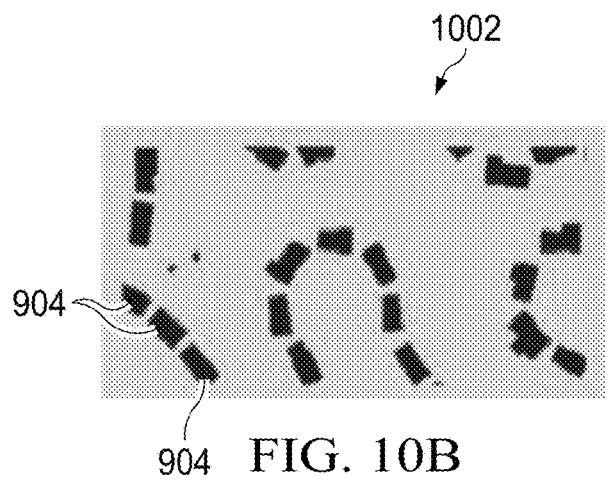

Concurrently, in an image preprocessing path, the image is input into building segmentation module 602. Building segmentation module 602 uses known image semantic segmentation techniques to label every pixel of the aerial image as building or non-building, resulting in a building mask, as shown in FIGS. 10A and 10B. An example image semantic segmentation algorithm is described in Liang-Chieh Chen et al. Encoder-Decoder with Atrous Separable Convolution for Semantic Image Segmentation. https://arxiv.org/abs/1802.02611v3.

Figure 11A:
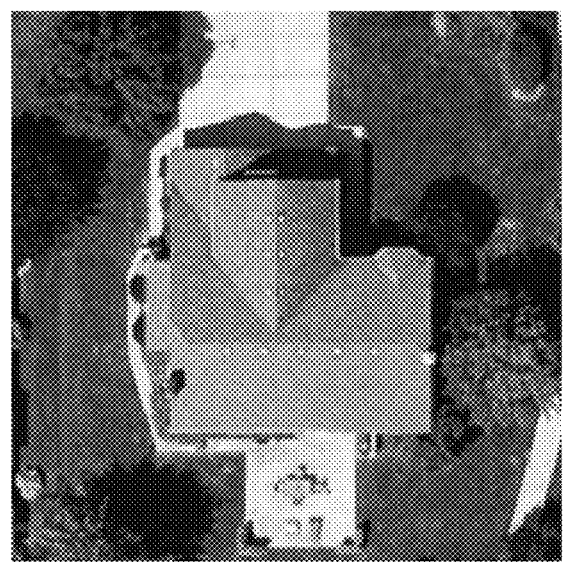
FIGS. 11A and 11B illustrate use of the building mask to obtain an extent of the building and crop the image so that the building is centered in the image and axis-aligned to a grid, according to an embodiment.
Figure 11B:
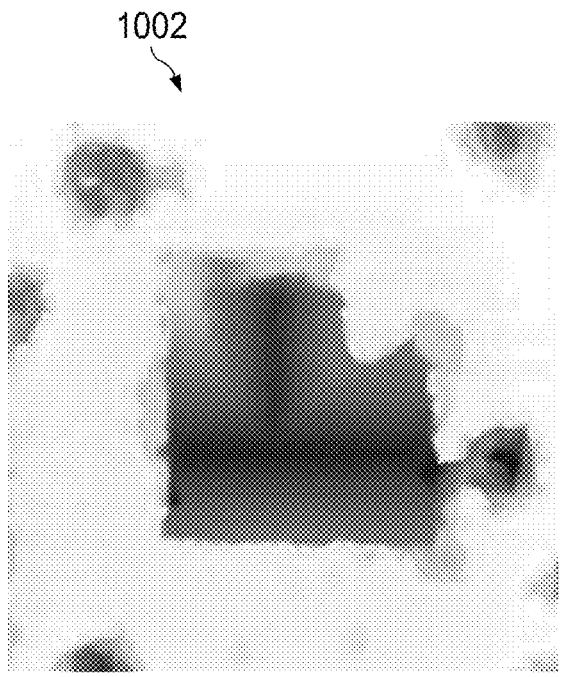

The building mask and aligned DSM/image are then input into orientation and cropping module 604. Orientation and cropping module 604 use the LiDAR data within the building mask to calculate the orientation of each roof face. In an alternative embodiment, a neural network is used to predict roof face orientation. For example, the LiDAR data is used to calculate a dominant orientation for the entire roof, and then "snap"that orientation onto a 90 degree grid. The building mask is also used to obtain a basic extent of the building and to crop the image so that the building is centered in the image and axis-aligned, as shown in in FIGS. 11A and 11B. After the preprocessing, the image and DSM are properly formatted for input into one or more neural networks, such as a convolutional neural network (CNN) or any other suitable neural network for reconstruction of a 3D building model, and in particular a 3D roof model.

Figure 9A:
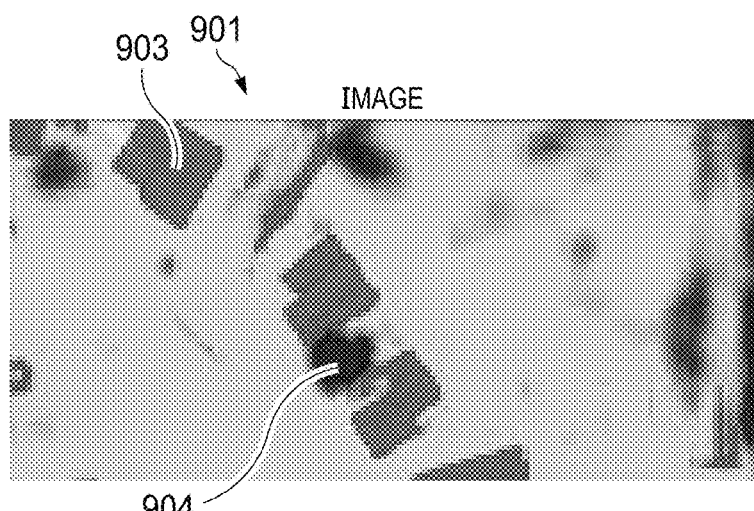
FIGS. 9A-9C illustrate using semantic segmentation techniques separately on the image and the DSM to predict building structures, trees and background, and then use cross-correlation to calculate the location at which the image and DSM align, according to an embodiment.
Figure 9B:
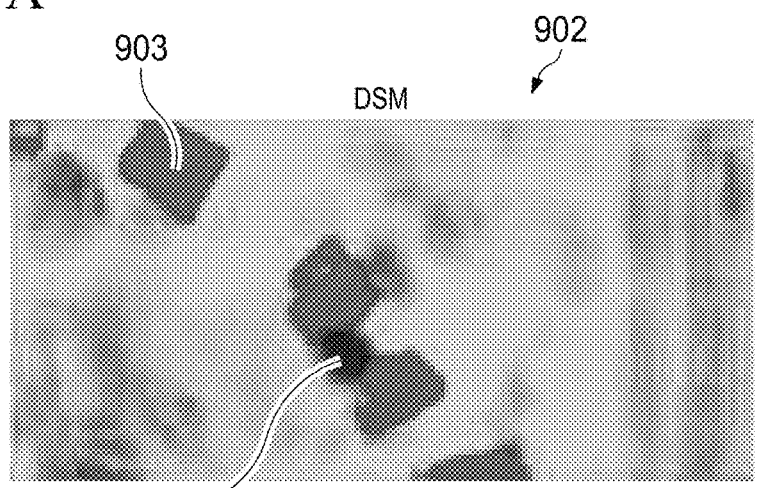
Figure 9C:
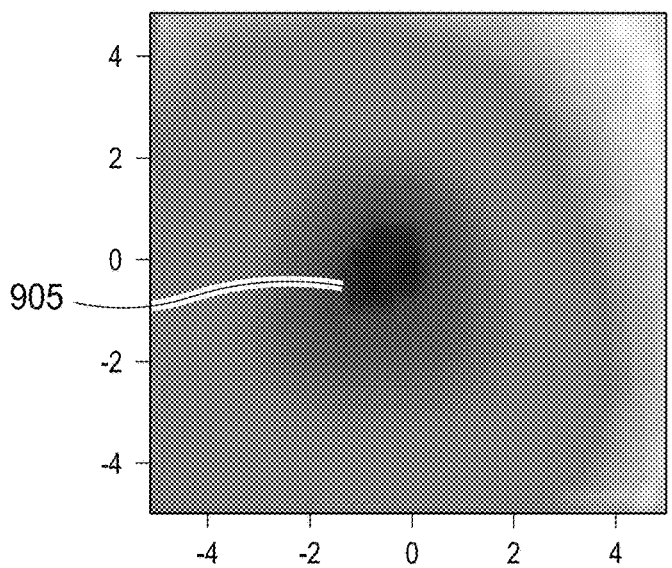

FIGS. 9A-9C further illustrate using semantic segmentation techniques separately on image 901 and DSM 902 to predict building structures 903, trees 904 and background. Cross-correlation is used to calculate the location at which the image and DSM align, according to an embodiment, as shown in FIG. 9C, where the light spot 905 indicates where the pixels of the two images are more closely aligned. An example cross-correlation technique is described in Briechle, Kai, and Uwe D. Hanebeck. Template matching using fast normalized cross correlation. *Optical Pattern Recognition XII. Vol.* 4387. International Society for Optics and Photonics, 2001.

Alternatively, image 901 and DSM 902 are feed into a neural network that is trained to predict the numerical offset between two images, such as described in Sergey Zagoruyko, Nikos Komodakis. Learning to Compare Image Patches Via Convolutional Neural Networks. CVPR.2015.7299064. Instead of predicting a similarity value, an x/y offset value between the image and DSM is predicted.

Figure 12:
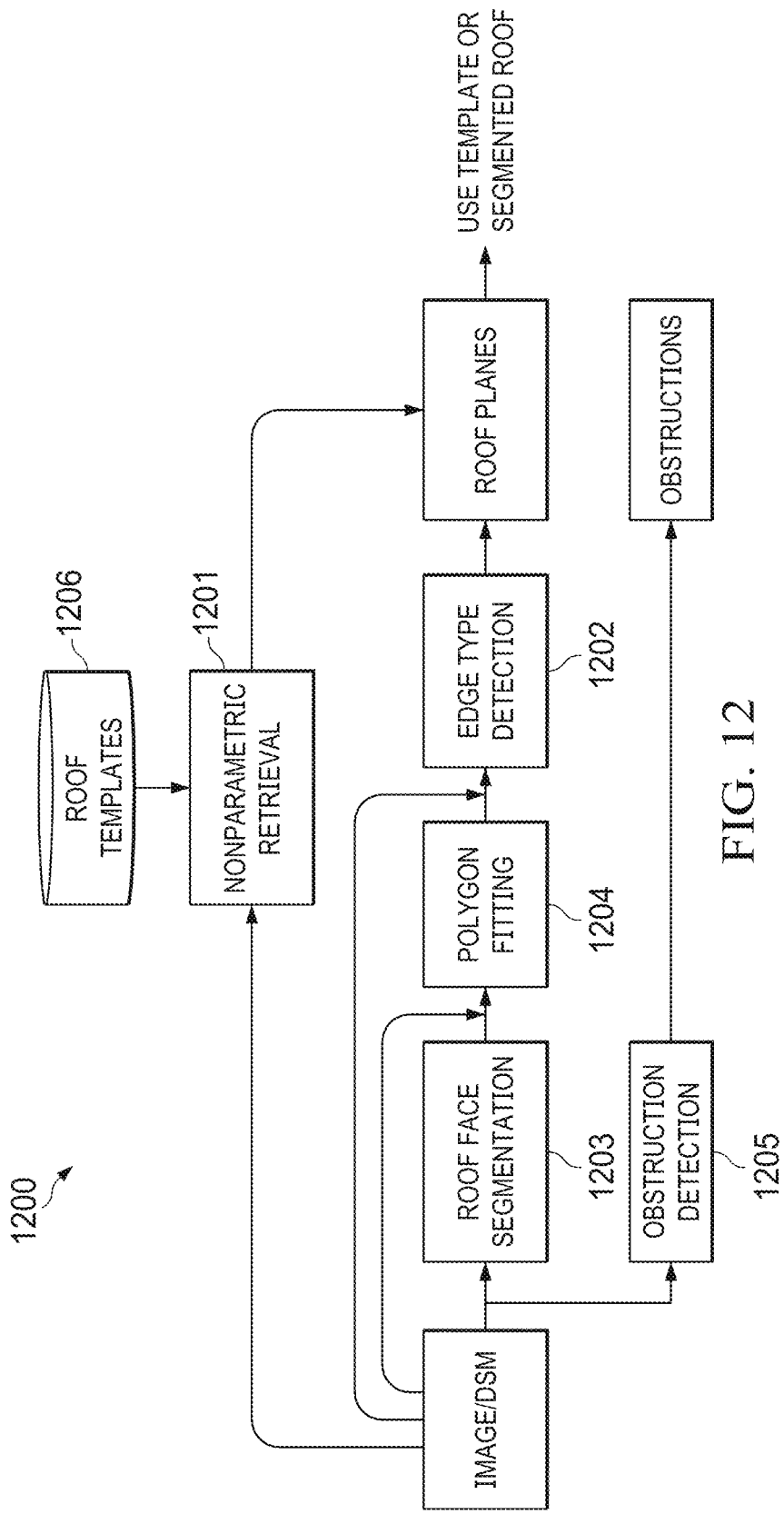
FIG. 12 is a flow diagram of a reconstruction process to produce a 3D building model from the preprocessed image and DSM, according to an embodiment.

FIG. 12 is a flow diagram of a reconstruction process to produce a 3D building model from the preprocessed image and DSM, according to an embodiment. The preprocessed image/DSM is input into roof face segmentation module 1203. Roof face segmentation module 1203 uses a neural network to generate a mask for each roof face using instance segmentation, such as described in Davy Neven et al. Instance Segmentation by Jointly Optimizing Spatial Embeddings and Clustering Bandwidth. (https://arxiv.org/abs/1906.11109v1).

Figure 13:
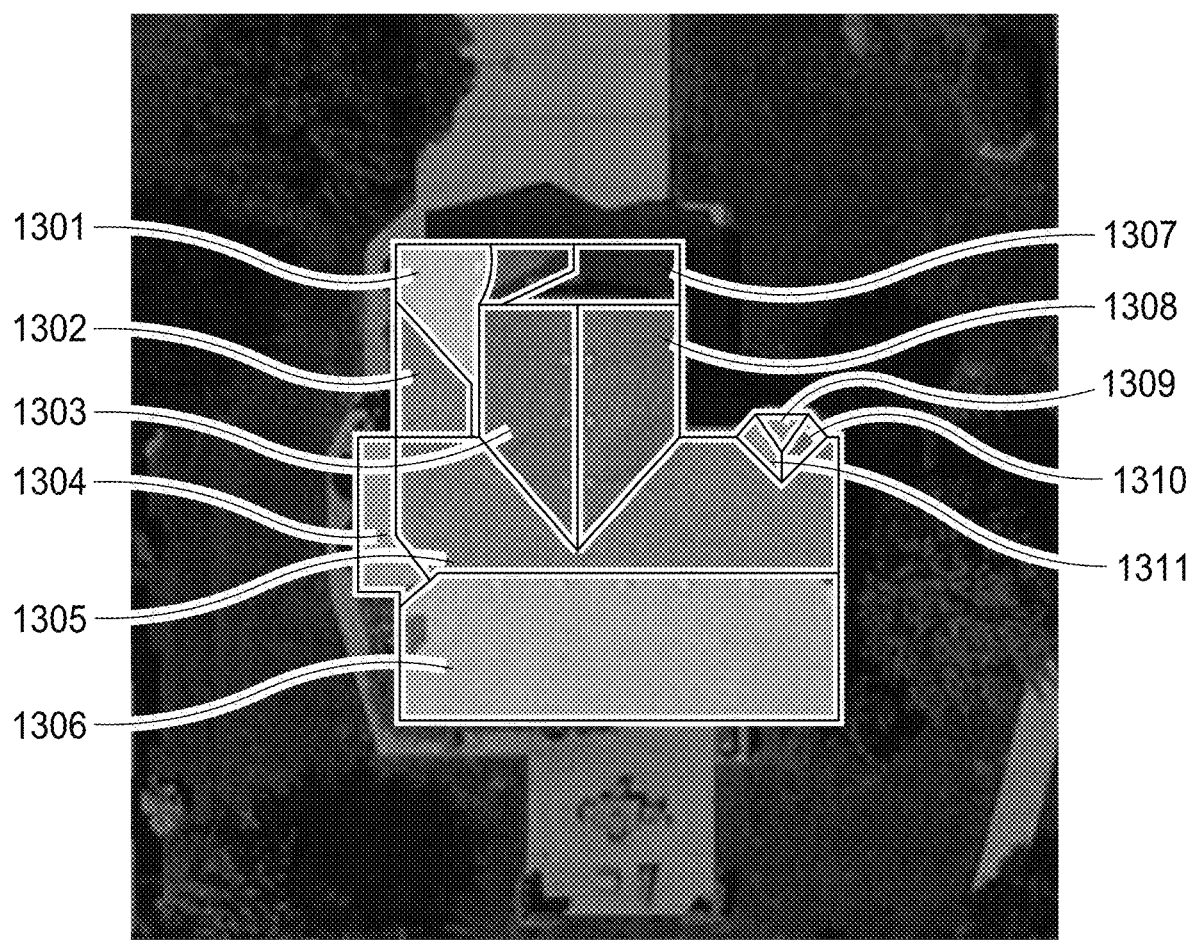
FIG. 13 illustrates output masks generated by a neural network for each roof plane using instance segmentation techniques, according to an embodiment.

FIG. 13 illustrates example roof face masks 1301-1311 generated by a neural network using instance segmentation techniques. After the roof face masks are generated, the masks are input into polygon fitting module 1204, which uses basic heuristics to convert the masks into 2D polygons and to remove discontinuities. The LiDAR data is then used to project the 2D polygons into 3D polygons using RANSAC fitting, as described in Yang, Michael Ying, and Wolfgang Forstner. Plane detection in point cloud data. *Proceedings of the 2nd int conf on machine control guidance, Bonn. Vol. I*. 2010. In an alternative embodiment, a neural network is used to predict 3D polygons from 2D polygons.

Figure 25A:
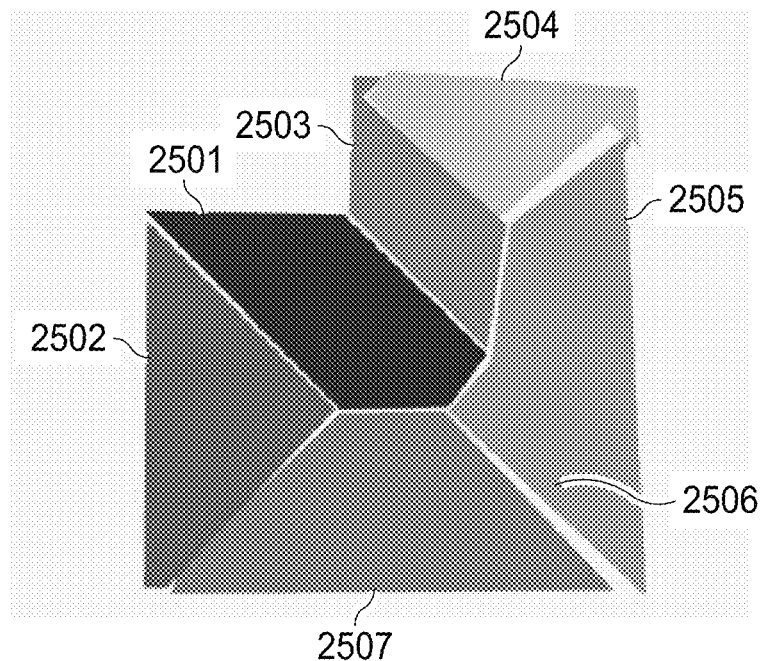
FIGS. 25A and 25B are before and after images illustrating a snapping algorithm to remove gaps between roof faces, according to an embodiment.
Figure 25B:
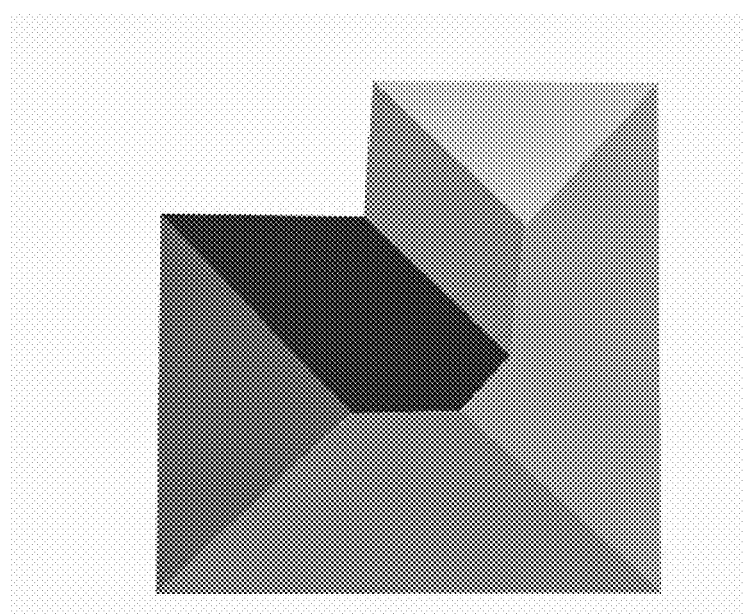

By converting roof face masks to polygons naively, gaps between the roof faces may be introduced, as shown in FIG. 25A. By generating a 2D mesh instead of separate polygons, gap-free 2D roof faces can be generated, as shown in FIG. 25B. In an embodiment, semantic segmentation techniques are used to predict edge and node probabilities for every pixel in the image. Poisson disk sampling is then used to select points along the nodes, edges and also uniformly across the image, as described in Cook, Robert L. Stochastic Sampling in Computer Graphics. *ACM transactions on Graphics*, 5, 1, January 1986, pp. 51-72.

Figure 26:
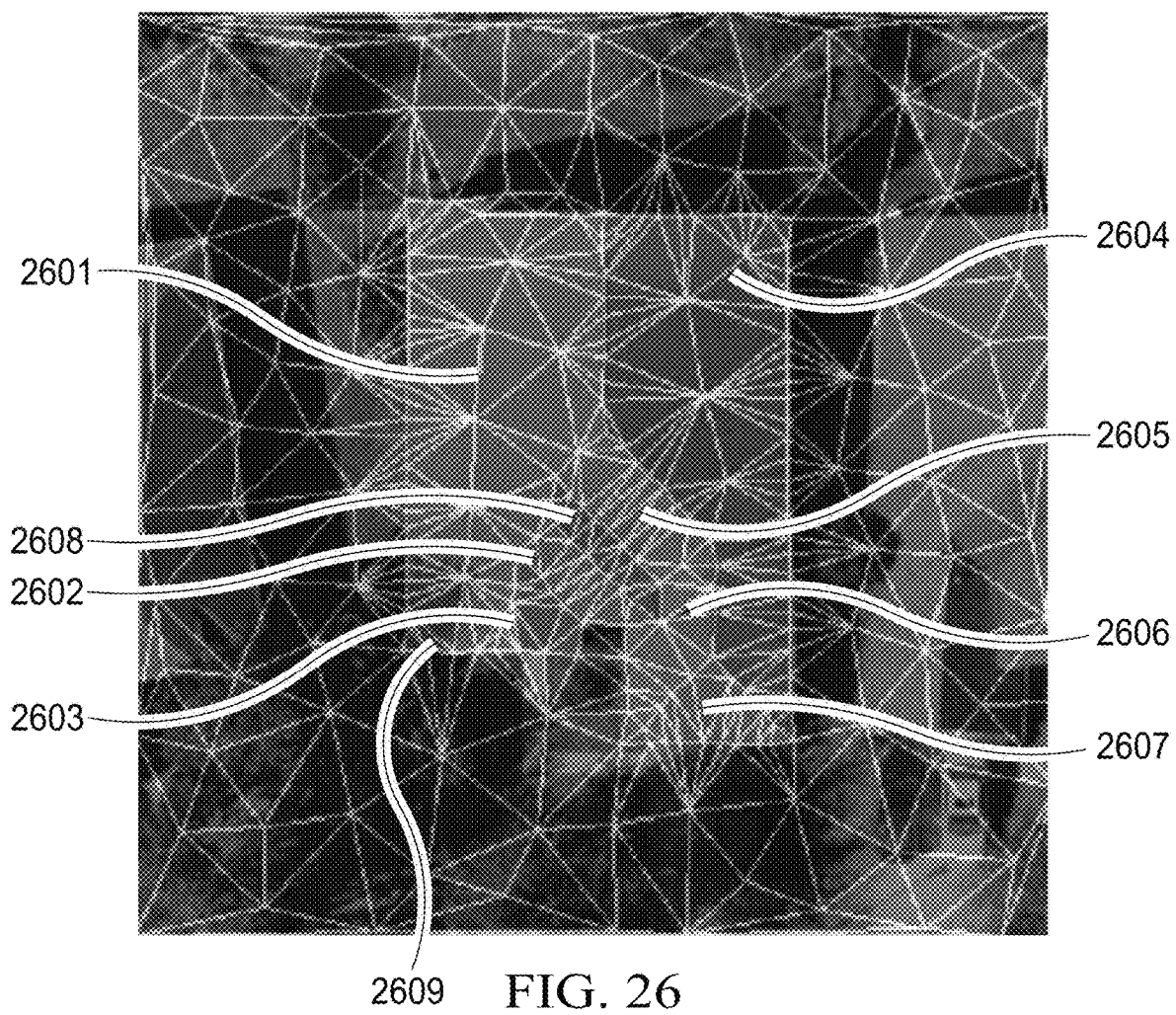
FIG. 26 is a top plan view of a 2D mesh overlying an image showing gap-free roof faces, according to an embodiment.

The disk radius is varied to sample more densely at the nodes and edges. A Delaunay triangulation is then performed to generate a 2D mesh. Each triangle in the 2D mesh is labeled according to its roof face. By combining all triangles in the 2D mesh with a given roof face label, a polygon is extracted for each roof face 2501-2507 that has no gap between adjacent roof faces, as shown in FIG. 25B. FIG. 26 is a top plan view of a 2D mesh overlying an image showing gap-free roof faces, according to an embodiment.

Figure 14:
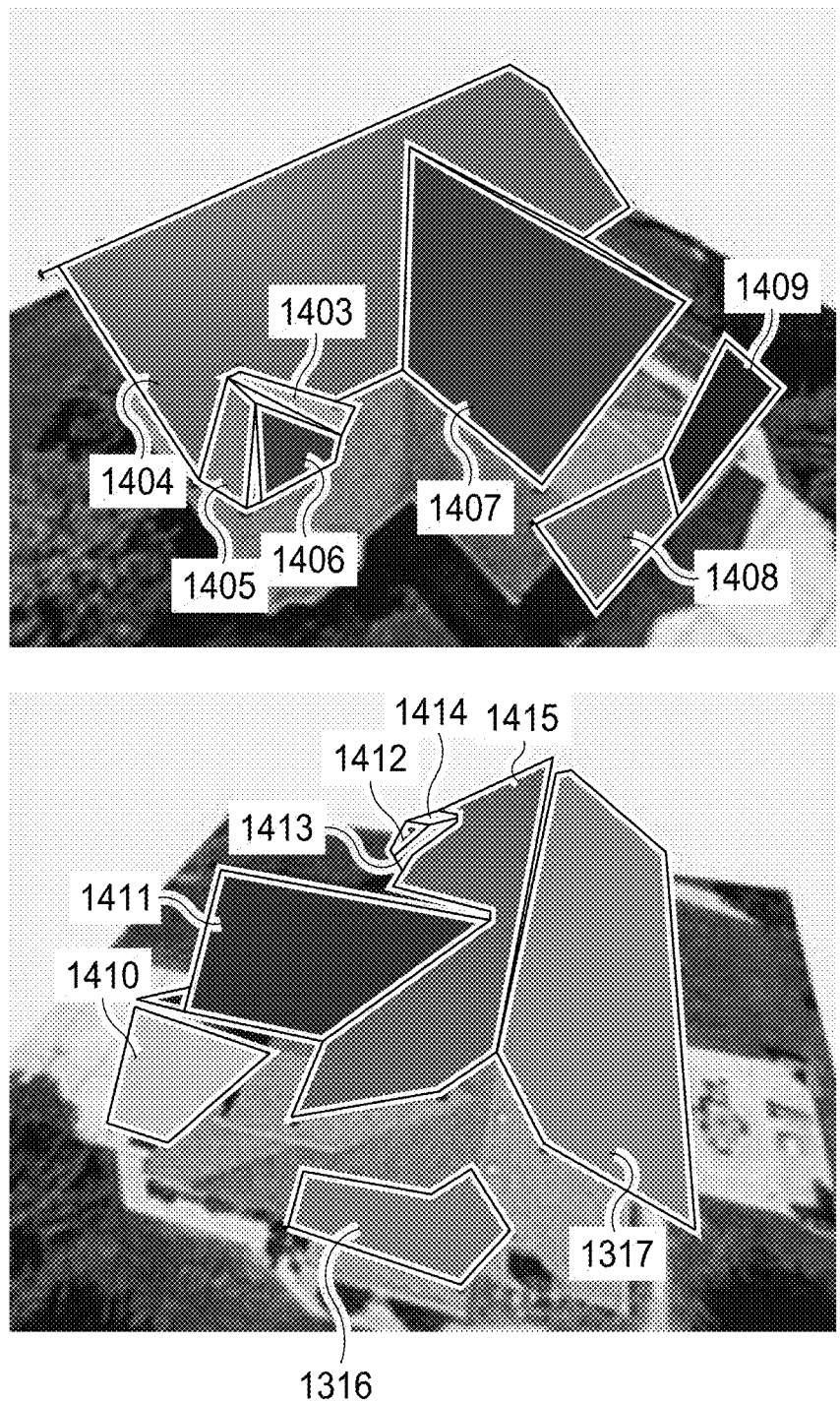
FIG. 14 illustrates using heuristics and polygon fitting to convert the roof planes into polygons, and then use the DSM to project the two-dimensional (2D) polygons into 3D polygons, according to an embodiment.

FIG. 14 illustrates using heuristics and polygon fitting to convert the roof planes into polygons, and then use the 3D data to project the 2D polygons into 3D polygons. Once the 3D polygons are generated, an edge of each polygon is selected to be an "azimuth edge," and is assigned a height and pitch to define a 3D plane. For example, when the 2D polygons are projected into 3D polygons, the planes are forced to point in one of the four cardinal directions relative to the dominant roof orientation (left, right, up, down). For each possible direction, the slope and height of the plane is determined, since the azimuth/direction is fixed. The direction, slope, and height that fits best is then selected. For a south-facing roof face, there will be an edge running eastwest that is flat and whose direction is perpendicular to the azimuth direction of the plane. Any point along the edge can be used to draw a plane with a given height and slope, such that the edge lies along the plane.

The last step in the roof face segmentation pipeline shown in FIG. 12 is to input the 3D polygons into edge type detection module 1202. Edge type detection module 1202 uses a neural network and known image semantic segmentation techniques to predict the edge types for all of the edges of the 3D polygons. Examples of edge types include but are not limited to: eave, rake, ridge, valley and hip. An example image semantic segmentation technique is described in Liang-Chieh Chen et al. Encoder-Decoder with Atrous Separable Convolution for Semantic Image Segmentation. (https://arxiv.org/abs/1802.02611v3).

Figure 17:
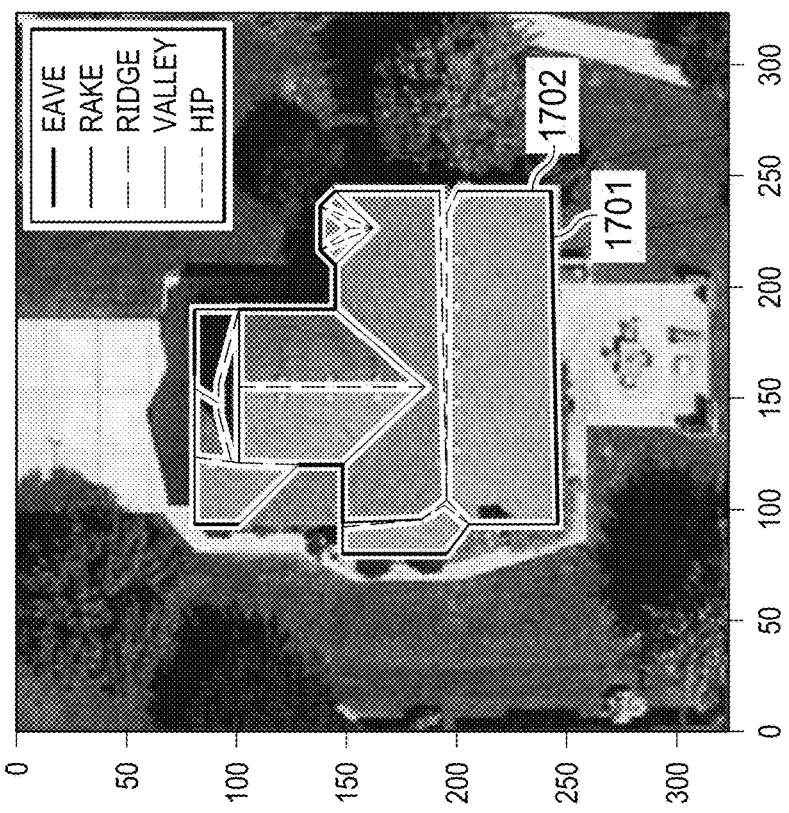
FIG. 17 illustrates the output of a neural network for predicting edge types for all the edges of the 3D polygons, according to an embodiment.

FIG. 17 illustrates the output of a neural network for predicting edge types for all the edges of the 3D polygons, according to an embodiment. The predicted edge types are used for defining setbacks. For example, solar panels should not be placed near the edges of roof faces to allow access for firefighters, etc.

In a separate roof face process, a roof template database 1206 is searched for a matching roof template. In an embodiment, the process includes: 1) axis-aligning the image as previously described; 2) calculating an embedding for the image; 3) finding a roof template in database 1206 that is similar to the roof being reconstructed based on the embedding; 4) finding the height, width, length and position of the roof template; 5) overlaying the roof template on the roof image; 6) adjusting the internal structure of the roof template to match the roof image; and 7) checking if the roof template is more accurate than the roof faces generated by roof face segmentation module 1203. After the checking step, one of the adjusted roof template or the roof faces generated by roof face segmentation module 1203 are selected to be included in the estimated 3D roof model. In an embodiment, steps 2 and 3 above use known metric learning techniques for retrieval of the roof templates, such as described in Florian Schroff et al. FaceNet: A Unified Embedding for Face Recognition and Clustering (https://arxiv.org/abs/1503.03832).

Figure 15A:
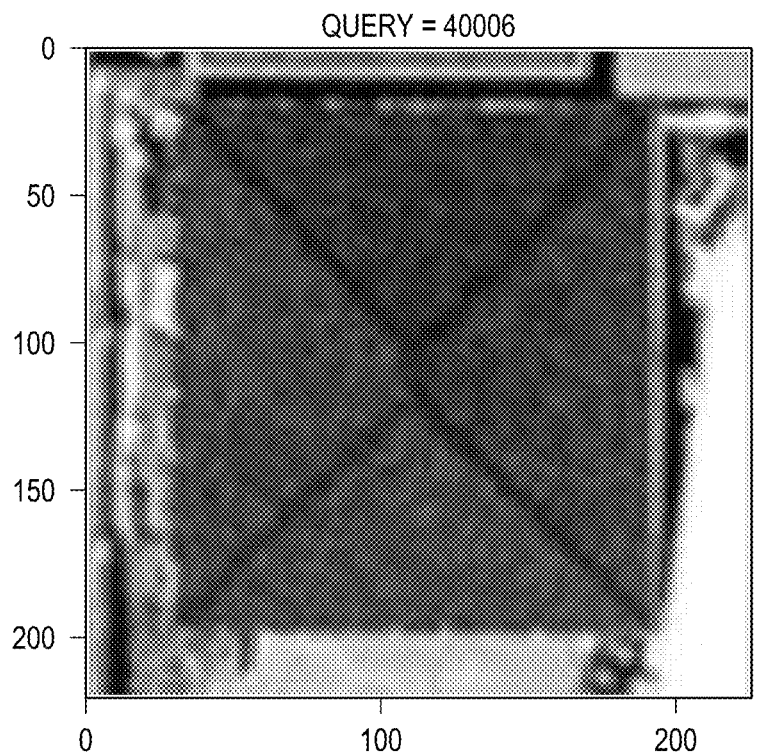
FIGS. 15A and 15B illustrate a nonparametric retrieval technique to find a matching roof type template in a database and then overlay the template on the image, according an embodiment.
Figure 15B:
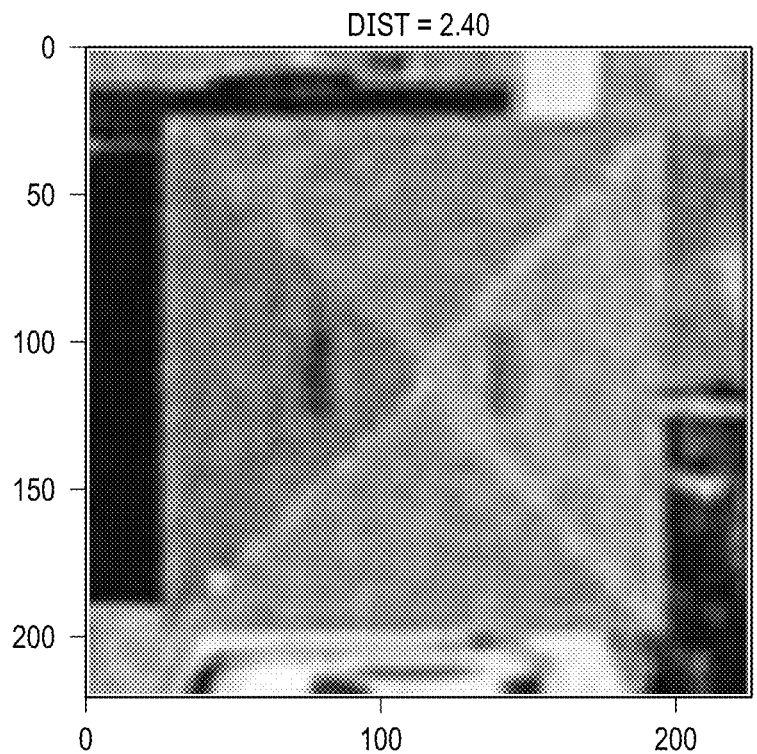
Figure 16C:
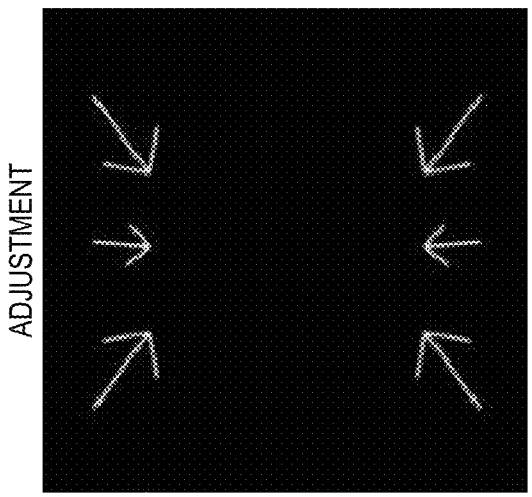
FIGS. 16A-16C illustrate using a neural network to predict an offset for every node in the roof to adjust the internal structure of the roof template to match the image, according to an embodiment.
Figure 16B:
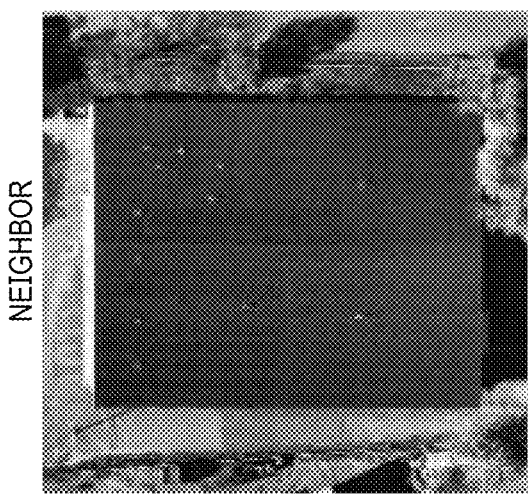
Figure 16A:

FIGS. 15A and 15B illustrate the nonparametric retrieval technique described above. In step 6, a neural network is used to predict an offset for every node in the roof to adjust the internal structure of the roof template to match the image, as illustrated in FIGS. 16A-16C.

In the process described above, an embedding is an N-dimensional vector (e.g., N=64) produced by a neural network. The neural network is trained so that if two roofs are similar, then their embedding will become close in the embedding space, and if they are dissimilar then their embeddings will be far apart. In step 4, the size of the template is known and the size of the target roof is estimated using the segmentation/alignment pipeline previously described.

Figure 18:
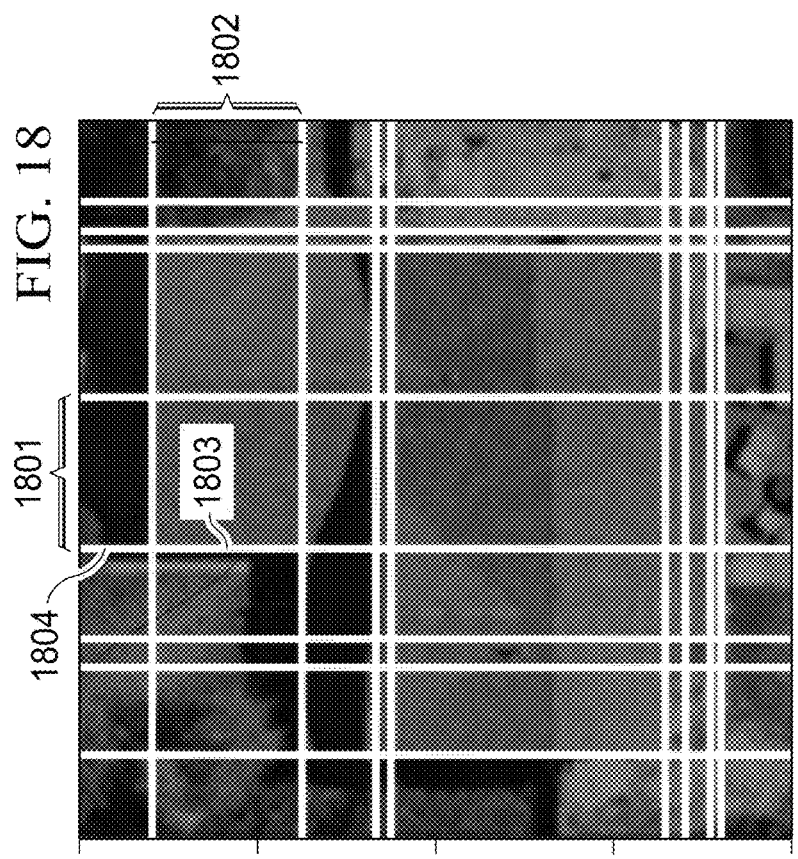
FIG. 18 illustrates an alternative technique for using a neural network for wall detection to be used in an alternative polygon fitting algorithm, according to an embodiment.
Figure 19:
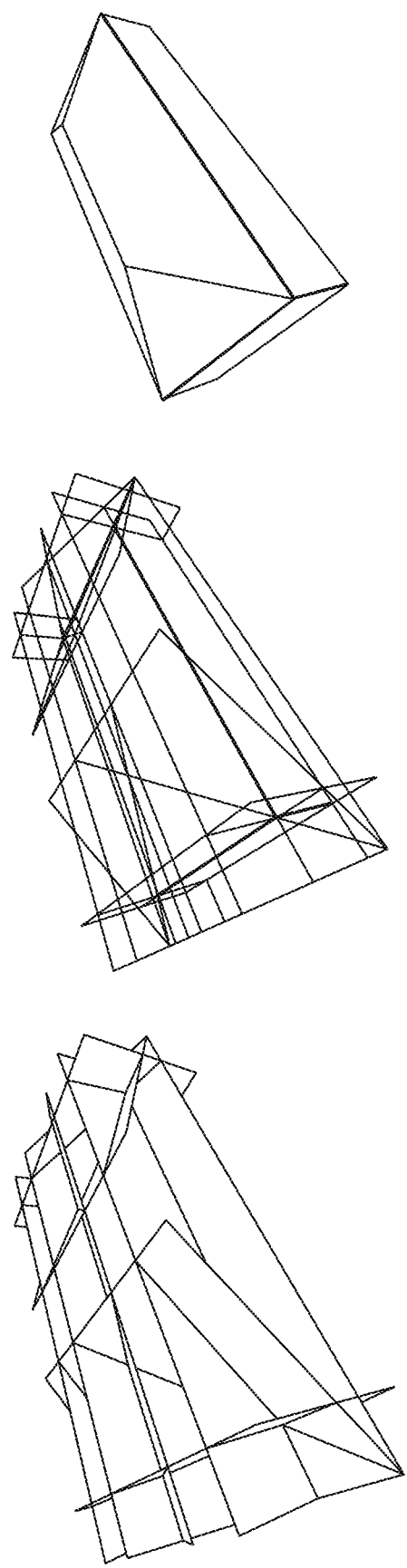
FIG. 19 illustrates the alternative polygon fitting algorithm where the detected walls and roof planes are combined and all possible intersections between them are determined, according to an embodiment.

FIGS. 18 and 19 illustrate an alternative technique for using a neural network for wall detection with a polygon fitting algorithm, according to an embodiment. A neural network is first used to predict for every row and column of an image grid containing the roof image, whether there is a wall for that row/column. A polygon fitting algorithm is then used to reconstruct the roof by combining all of the walls and roof planes and finding all possible intersections between them. Optimization is then used to choose which roof structure is the most accurate. An example polygon fitting algorithm is described in Nan, Liangliang, and Peter Wonka. Polyfit: Polygonal surface reconstruction from point clouds. *Proceedings of the IEEE International Conference on Computer Vision.* 2017.

Figure 20:
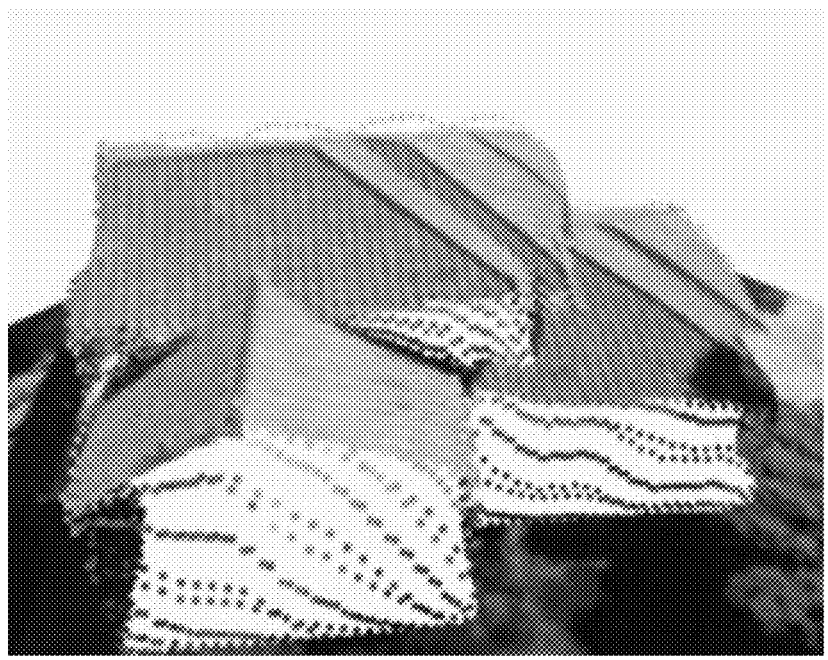
FIG. 20 illustrates a synthetic LiDAR technique wherein a neural network is used to compute a height map from a 2D image and then uses the height map to convert the 2D image into a rough 3D model of the building, according to an embodiment.

FIG. 20 illustrates a synthetic LiDAR technique wherein a neural network is used to compute a height map from a 2D image and then uses the height map to convert the 2D image into a rough 3D model of the building, according to an embodiment. This technique can perform reconstruction from only an image without any 3D data, as described in Srivastava, Shivangi, Michele Volpi, and Devis Tuia. Joint height estimation and semantic labeling of monocular aerial images with CNNs. *IEEE International Geoscience and Remote Sensing Symposium (IGARSS).* 2017.

Figure 21:
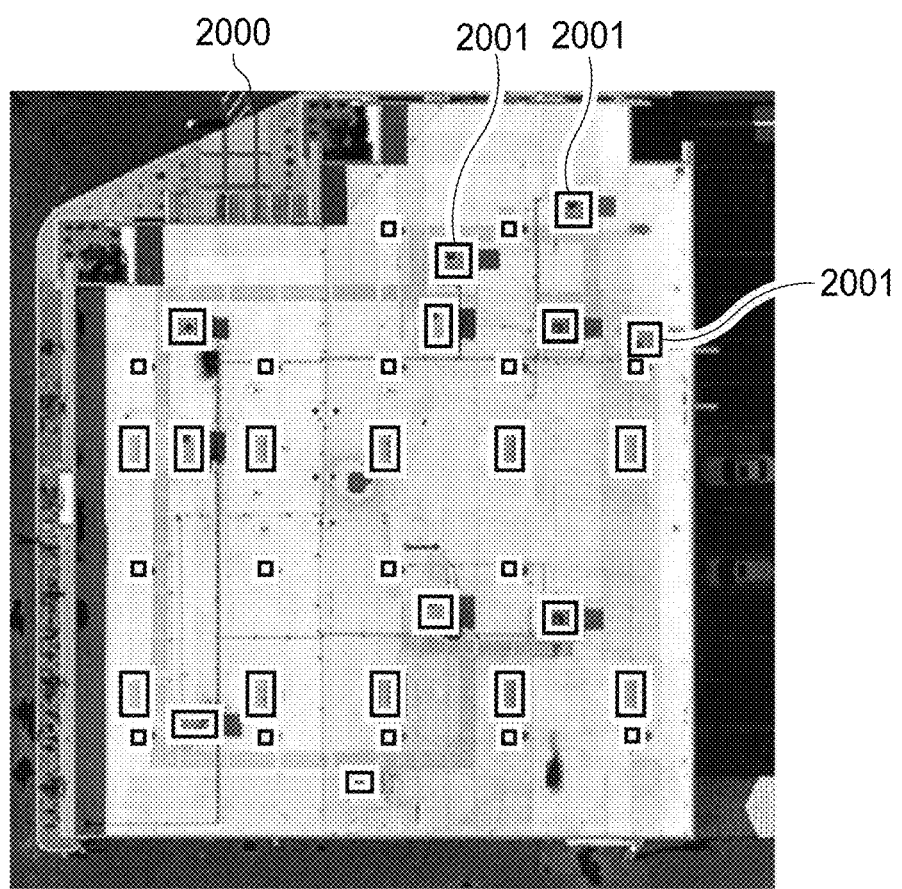
FIG. 21 illustrates a technique to detect obstructions on the roof, according to an embodiment.

FIG. 21 illustrates a technique to detect obstructions on the roof, according to an embodiment. Referring to FIG. 12, the image and DSM are input into obstruction detection module 1204, which outputs rooftop obstructions. In an embodiment, obstruction detection module 1204 includes a neural network that is trained to predict rooftop obstructions using instance segmentation techniques, such as described in He, Kaiming, et al. Mask R-CNN. *Proceedings of the IEEE International Conference on Computer Vision,* 2017. These rooftop obstructions show where solar panels cannot be installed and also objects that may cast shadows on the solar panels.

Figure 28:
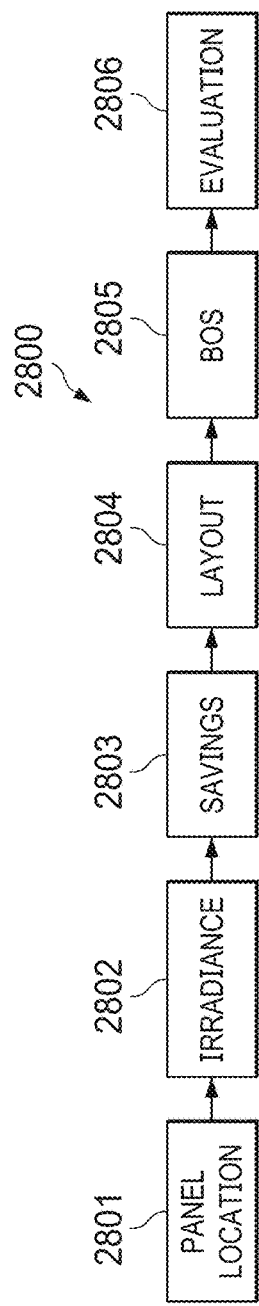
FIG. 28 is a process flow of automated solar energy system design using an estimated 3D building model generated as described in reference to FIGS. 1-27, according to an embodiment.

Referring back to FIG. 2, process flow 200 continues by automatically generating a virtual solar energy system based on the estimated roof model, shading/irradiance data (the flux of radiant energy per unit area) from a shading/irradiance model, component database and user preferences, as described in reference to FIG. 28.

The component database includes datasheets and price lists for commercially available solar energy equipment and hardware, including but not limited to: solar panels, inverters, monitoring equipment, racking and mounting hardware (e.g., rails, flashings, lugs, mounting brackets, wire clops, splice kits, braces, end caps, attachments, tilt legs), balancing hardware (e.g., DC/AC disconnects, junction boxes, combiner boxes, circuit breakers, fuses, load centers, rapid shutdowns, surge devices), wire, charge controllers, batteries, etc.

The system design is then simulated using performance simulation 206 to determine the electrical performance of the system design. The performance data resulting from performance simulation is used with utility rate data and a user consumption profile to determine monthly cost savings, monthly offset and other financial data that is useful to a consumer or professional solar energy panel installer. The performance simulation 206 uses the irradiance values computed according to the method described in reference to FIG. 27. Given the amount of irradiance on each panel, the amount of current each panel produces is estimated. Using circuit modeling, the system generates a combined IV curve for all of the solar panels connected in a string. The inverter is then simulated by finding the maximum power point and estimating the conversion efficiency into AC power to finally get the energy output in kWh for each hour. This calculation is performed, for example, for every hour or N minute increments (e.g., N=15) of a simulated year.

In an embodiment, the energy consumption profile and utility rate used in the consumption step are used to calculate energy costs for the building before the solar energy system is installed. The solar production is subtracted from energy consumption to get the post-solar energy consumption for every hour of a simulated year. The monthly bill for the new consumption values are then calculated. By comparing the two bills, the monthly savings of installing the solar energy system is calculated.

In an embodiment, further simulations can be run to calculate return on investment (ROI), net present value (NPV) and annual cash flows under different financing schemes like cash purchases, loans and leases.

EXAMPLE PROCESSES

Figure 22:
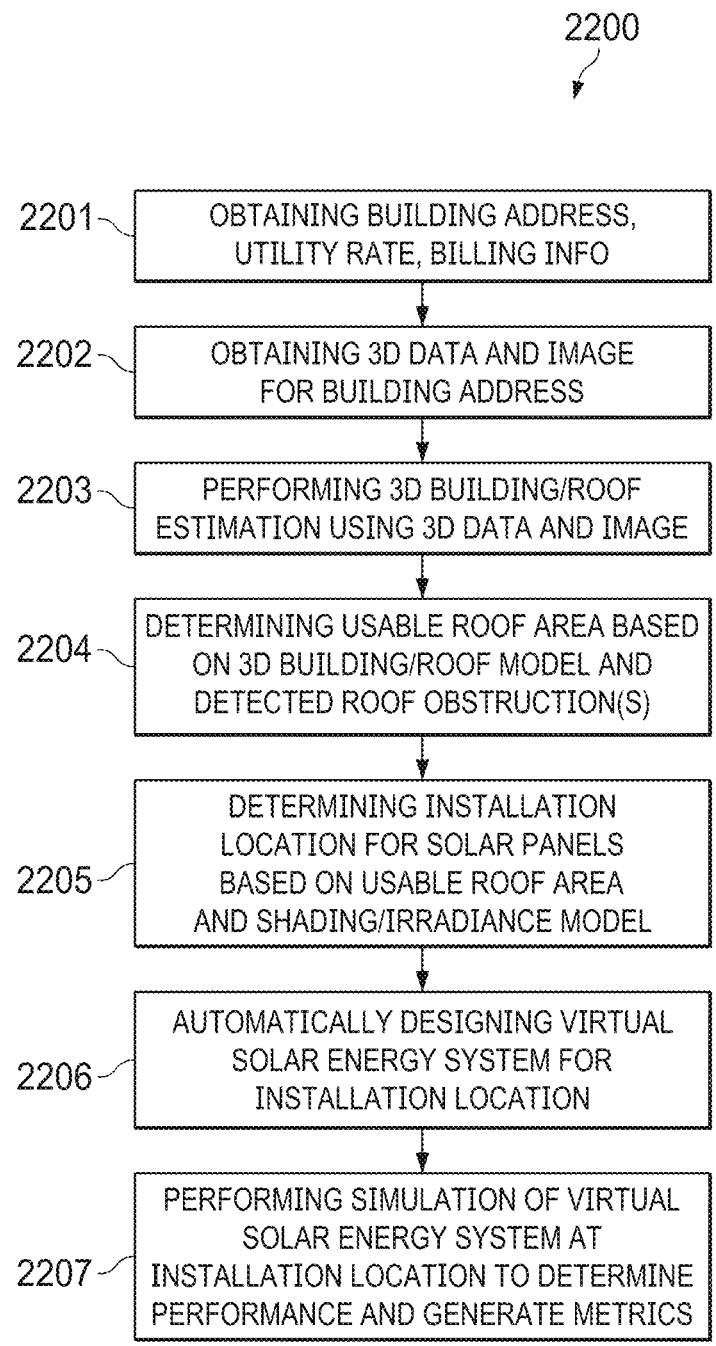
FIG. 22 is a flow diagram of an automated 3D building estimation process, according to an embodiment.

FIG. 22 is a flow diagram of an automated 3D building estimation process 2200, according to an embodiment. Process 2200 can be implemented using the computer architecture 2900 described in reference to FIG. 29.

Process 2200 begins by obtaining a building address, utility rate and billing information (2201) and obtaining 3D data and image data for the building address (2202). In an embodiment, the building address is entered by a user through a GUI of an online automated 3D building design tool. In an alternative embodiment, the address is obtained programmatically through an API, for example. In an embodiment, the utility rate can be obtained from a database of utility rates maintained by a utility company or obtained from a third party provider, such as Genability Inc. of San Francisco, California, USA. In an embodiment, the image data and 3D data is obtained from a public or proprietary database of images and 3D data that can be retrieved using the building address of the building. In an embodiment, the 3D data is 3D LiDAR data.

Process 2200 continues by performing 3D building/roof estimation using the 3D data and image (2203), and determining the usable roof area based on the 3D building/roof model and detected roof obstructions (2204), as described in reference to FIGS. 2-21.

Process 2200 continues by determining an installation location in the usable roof area for solar panels based on the usable roof area and shading/irradiance model (2205), and automatically designing a virtual solar energy system for the installation location (2206).

Process 2200 continues by performing a simulation of the virtual solar energy system at the installation location to determine performance and generate metrics (2207).

The metrics, such as monthly cost savings and offset, can be displayed to the user through a GUI of the automated design tool or provided in a report to a customer or professional solar panel installer.

FIG. 23 is a flow diagram of a pre-processing process 2300 for the 3D building estimation process of FIG. 22, according to an embodiment. Process 2300 can be implemented using the computer architecture 2900 described in reference to FIG. 29.

Process 2300 begins by generating a DSM from a 3D mesh (2301), as described in reference to FIGS. 5-7. For example, the DSM can be rasterized into a 2D image using a spike free 3D mesh of LiDAR data.

Process 2300 continues by aligning the image and DSM image so that they aligned to each other (2302), as described in reference to FIGS. 6-9.

Process 2300 continues by generating a building mask from the image (2303), and orienting, cropping and axis-aligning the image and DSM to a grid determine the orientation or each roof face using the building mask and 3D data (2304), as described in reference to FIGS. 10-11. The building mask is also used to obtain the building extent.

FIGS. 24A and 24B are flow diagrams of a reconstruction processes 2400, 2500 for the 3D building estimation process of FIG. 22, according to an embodiment. Processes 2400, 2500 can be implemented using the computer architecture 2900 described in reference to FIG. 29.

Referring to FIG. 24A, process 2400 begins by performing roof face segmentation to obtain 2D roof faces (2401), and then 3D polygon fitting the 2D roof faces using the image and 3D data (2402). For example, roof segmentation generates 2D roof faces, which are fitted to 2D polygons using heuristics to remove discontinuities, and then projected into 3D polygons using RANSAC fitting using the 3D data. Process 2400 continues by performing edge type detection on the 3D polygons using the image and DSM (2404). Examples of edge types include but are not limited to: eave, rake, ridge, valley and hip. Edge type detection can be implemented using semantic segmentation techniques. Process 2400 continues by performing obstruction detection using the image/DSM (2404).

Referring to FIG. 24B, process 2405 begins by retrieving a roof template that matches the image/DSM (2406), as described in reference to FIG. 14, and then selecting either the 3D roof faces resulting from segmentation or the roof template as the 3D representation of the roof (2407). Processes 2400 and 2500 can be performed in parallel or in series.

Figure 27:
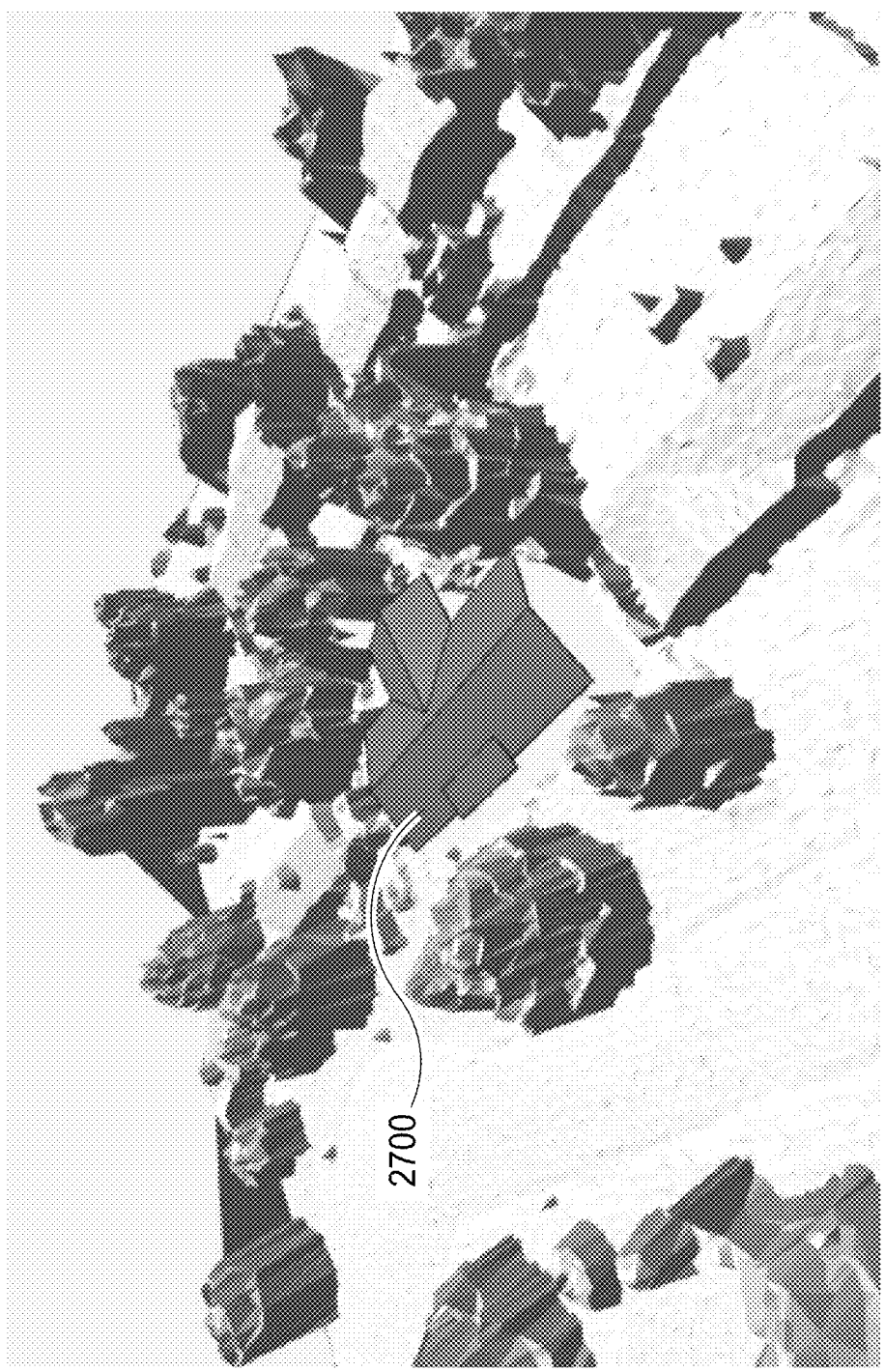
FIG. 27 illustrates shading by ray tracing against a 3D building model, obstructions and surrounding, according to an embodiment.

FIG. 27 illustrates shading by ray tracing against a 3D building model, obstructions and surrounding, according to an embodiment. In an embodiment, shading is determined using ray tracing against a 3D model of the building 2700, rooftop obstructions, and its surroundings. The LIDAR mesh (generated from the earlier spike free triangulation step) is used to model the building's surroundings, which can then cast shadows onto the building. For a given point on the roof or on a solar panel, the system calculates, for every hour of a simulated year, whether the solar panel is in shade. Additionally, the system calculates irradiance by combining weather data with shading information. Based on the angle of the solar panel surface relative to the sun, and based on whether the solar panel is in shade or not, the system calculates, for every hour of the simulated year, an amount of sunlight hitting the solar panel surface in W/m$^2$.

FIG. 28 is a process flow 2800 of automated solar energy system design using an estimated 3D building model generated as described in reference to FIGS. 1-27, according to an embodiment.

Process 2800 begins by determining a grid of all possible panel locations based on the desired panel size and spacing (2801). Process 2800 continues by calculating, for every hour of the year, irradiance for each solar panel location based on weather data and the 3D model of the site, including the building, rooftop obstructions and its surroundings (2802). Process 2800 continues by estimating how much savings each potential panel will produce for every hour of the year based on its electrical characteristics and the utility rate (2803). Process 2800 continued by calculating the best set of panels to minimize cost and maximize savings (2804). For each potential model of inverter, process 2800 continues by determining the optimal number of inverters and connection of solar panels to each other and the inverter (2805). Given the combined panel/inverter system, process 2800 continues by re-evaluating the performance and savings (2806). The re-evaluation step reduces errors introduced by simplifying assumptions in earlier steps. The re-evaluation step also evaluates the cost and the aesthetics of the layout (e.g., are the panels in rectangular groups or irregular shapes).

Each step of process 2800 is run sequentially to generate a single optimal design using integer linear programming. Then, a genetic algorithm is used to make many small modifications at each step and determine which configurations produce the best design for the customer overall.

EXAMPLE SYSTEM ARCHITECTURE

Figure 29:
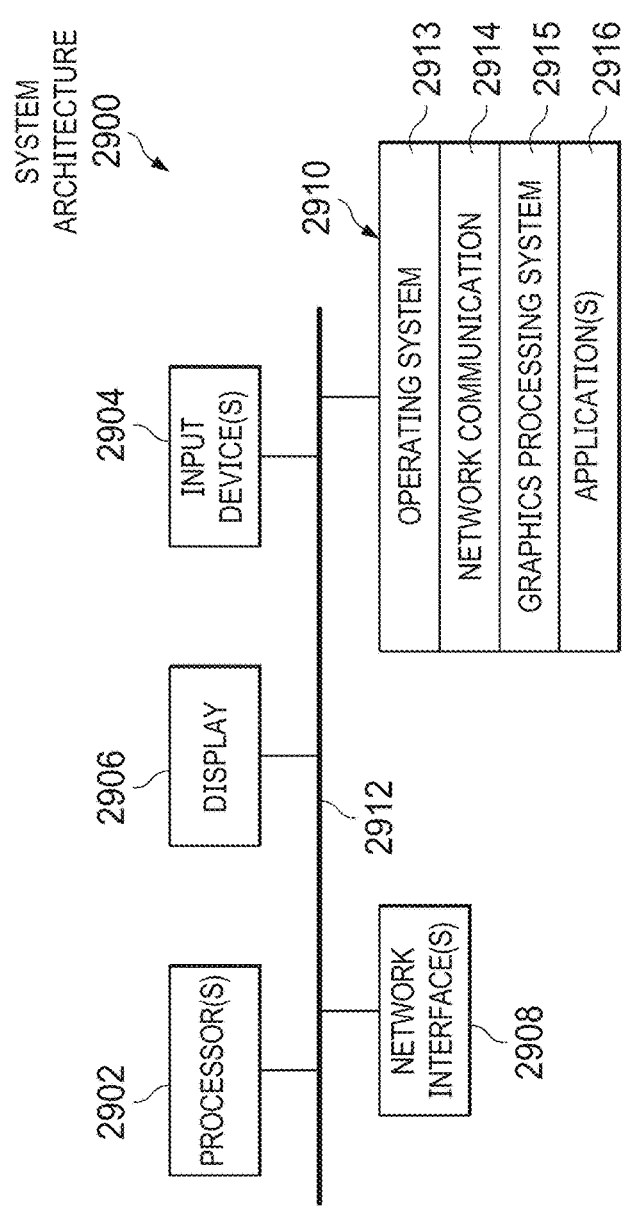
FIG. 29 is a block diagram of a computer architecture for implementing the features and processes described in reference to FIGS. 1-28.

FIG. 29 is a block diagram of a computer architecture 2900 for implementing the features and processes described in reference to FIGS. 1-28. The architecture 2900 can be implemented on any electronic device that runs software applications derived from compiled instructions, including without limitation personal computers, servers, smart phones, media players, electronic tablets, game consoles, email devices, etc. In some implementations, the architecture 2900 can include one or more processors 2902, one or more input devices 2904, one or more display devices 2906, one or more network interfaces 2908 and one or more computer-readable mediums 2910. Each of these components are coupled by one or more buses 2912.

Display device 2906 can be any known display technology, including but not limited to display devices using Liquid Crystal Display (LCD) or Light Emitting Diode (LED) technology. Processor(s) 2902 can use any known processor technology, including but are not limited to graphics processors and multi-core processors.

Input device 2904 can be any known input device technology, including but not limited to a keyboard (including a virtual keyboard), mouse, track ball, and touch-sensitive pad or display. In some implementations, the input device 2904 could include a microphone that facilitates voice-enabled functions, such as speech-to-text, speaker recognition, voice replication, digital recording, and telephony functions. The input device 2904 can be configured to facilitate processing voice commands, voiceprinting and voice authentication. In some implementations, audio recorded by the input device 2904 is transmitted to an external resource for processing. For example, voice commands recorded by the input device 2904 may be transmitted to a network resource such as a network server which performs voice recognition on the voice commands.

Bus 2912 can be any known internal or external bus technology, including but not limited to ISA, EISA, PCI, PCI Express, NuBus, USB, Serial ATA or FireWire.

Computer-readable medium 2910 can be any medium that participates in providing instructions to processor(s) 2902 for execution, including without limitation, non-volatile storage media (e.g., optical disks, magnetic disks, flash drives, etc.) or volatile media (e.g., SDRAM, ROM, etc.). Computer-readable medium 2910 can include various instructions 2914 for implementing operating system 2913 (e.g., Mac OS®, Windows®, Linux). Operating system 2913 can be multi-user, multiprocessing, multitasking, multithreading, real-time and the like. Operating system 2913 performs basic tasks, including but not limited to: recognizing input from input device 2904; sending output to display device 2906; keeping track of files and directories on computer-readable medium 2910; controlling peripheral devices (e.g., disk drives, printers, etc.) which can be controlled directly or through an I/O controller; and managing traffic on bus 2912. Network communications instructions 2914 can establish and maintain network connections (e.g., software for implementing communication protocols, such as TCP/IP, HTTP, Ethernet, etc.).

Graphics processing system 2915 can include instructions that provide graphics and image processing capabilities. For example, graphics processing system 2915 can implement the GUIs described with reference to FIGS. 1, 21A and 21B.

Application(s) 2916 can be an application that uses or implements the processes described in reference to FIGS. 1-28. The processes can also be implemented in operating system 2913.

In the context of the disclosure, the features and processes described above may implemented entirely or partially in a software program comprising instructions and data stored on a machine readable medium. A machine readable medium may be any tangible medium that may contain, or store, a program or data for use by or in connection with an instruction execution system, apparatus, or device. The machine readable medium may be a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out the disclosed embodiments may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention, or of what may be claimed, but rather as descriptions of features that may be specific to particular embodiments of particular inventions. Certain features that are described in this specification in the context of separate embodiments may also may be implemented in combination in a single embodiment. Conversely, various features that are described in the context of a single embodiment may also may be implemented in multiple embodiments separately or in any suitable sub-combination.

Various modifications, adaptations to the foregoing example embodiments disclosed herein may become apparent to those skilled in the relevant arts in view of the foregoing description, when read in conjunction with the accompanying drawings. Any and all modifications will still fall within the scope of the non-limiting and example embodiments of this invention. Furthermore, other embodiments not disclosed herein will come to mind to one skilled in the art as having the benefit of the teachings presented in the foregoing descriptions and the drawings.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity. What is claimed is:

What is claimed is:

1. A method comprising:
   obtaining, using one or more processors, an image of a roof of a structure based on an input address of the structure;
   obtaining, using the one or more processors, a three-dimensional (3D) point cloud containing the roof based on the input address;
   pre-processing the image and 3D point cloud to create a pre-processed image;
   reconstructing, using the one or more processors, a 3D roof model from the pre-processed image and 3D point cloud, the reconstructing including:
   predicting, using instance segmentation, a mask for each roof face;
   converting each roof face into a two-dimensional (2D) polygon; and
   projecting each 2D polygon into a 3D polygon representing the 3D roof model, wherein reconstructing the 3D roof model further comprises:
   calculating an embedding for the pre-processed image;
   finding a roof model stored in a database that matches the pre-processed image based on the embedding;
   determining a height, width, length, orientation and position of the roof based on the roof model;
   overlaying the roof model on the pre-processed image;
   adjusting an internal structure of the roof model to match the pre-processed image;
   comparing the adjusted roof model with the roof face masks; and
   selecting one of the adjusted roof model or the roof face masks to include in the 3D roof model.

2. The method of claim 1, wherein pre-processing the image and 3D point cloud, further comprises:
   generating a 3D mesh from the 3D point cloud;
   generating a digital surface model (DSM) of the roof using the 3D mesh;
   aligning the image of the roof and DSM;
   generating a roof mask from the image;
   using the 3D point cloud with the roof mask to calculate an orientation of each face of the roof;
   snapping the orientation of each roof face to a grid;
   using the roof mask to obtain an extent of the roof; and
   cropping the image so that the roof is centered in the image and axis-aligned to the grid.

3. The method of claim 2, wherein aligning the image and DSM further comprises:
   predicting, using semantic segmentation, the roof, trees and background in the image and DSM; and
   cross-correlating the locations of the roof, trees and background in the image with the locations of the roof, trees and background in the DSM to determine a location in the image that aligns the image and DSM.

4. The method of claim 3, wherein semantic segmentation is applied separately to the image and DSM.

5. The method of claim 2, wherein aligning the image and DSM further comprises:
   feeding the image and DSM into a neural network that is trained to predict numerical offsets between two images; and
   aligning the image and DSM using the predicted numerical offsets.

6. The method of claim 1, further comprising: obtaining, using a graphical user interface (GUI), the input address.

7. The method of claim 1, further comprising:
   detecting, using the one or more processors and instance segmentation, roof top obstructions; and
   using the 3D roof model and the detected roof top obstructions to determine a useable area of the roof.

8. The method of claim 7, further comprising:
   determining, using the one or more processors, a location in the useable area of the roof to install solar panels based on output of a shading model; and
   calculating, using the one or more processors, a number and size of solar panels needed to cover the location.

9. The method of claim 8, further comprising:
   estimating, using the one or more processors, an output power of the solar panels; and
   estimating, using the one or more processors, one or more financial or cost savings metrics based on the number and the size of the solar panels the output power of the solar panels and an average energy cost for the structure.

10. The method of claim 9, further comprising:
    displaying, using a graphical user interface (GUI), the one or more financial or cost savings metrics and the estimated power output.

11. A system comprising:
    one or more processors;
    memory coupled to the one or more processors and storing instructions that when executed by the one or more processors, cause the one or more processors to perform operations comprising:
    obtaining an image of a roof of a structure based on an input address of the structure;
    obtaining a three-dimensional (3D) point cloud containing the roof based on the input address;
    pre-processing the image and 3D point cloud to create a pre-processed image;
    reconstructing a 3D roof model from the pre-processed image and 3D point cloud, the reconstructing including:
    predicting, using instance segmentation, a mask for each face of the roof;
    converting each roof face into a two-dimensional (2D) polygon;
    projecting each 2D polygon into a 3D polygon representing the 3D roof model, wherein the operations further comprise:
    calculating an embedding for the pre-processed image;
    finding a roof model stored in a database that matches the pre-processed image based on the embedding;
    determining a height, width, length and position of the roof based on the roof model;
    overlaying the roof model on the pre-processed image;

adjusting an internal structure of the roof model to match the pre-processed image;

comparing the adjusted roof model with the roof face masks; and selecting one of the adjusted roof model or the roof face masks to include in the 3D roof model.

12. The system of claim 11, wherein pre-processing the image and 3D data, further comprises:

generating a spike free 3D mesh from the 3D point cloud;

generating a digital surface model (DSM) of the roof using the 3D mesh;

aligning the image and DSM;

generating a roof mask from the image;

using the 3D point cloud with the roof mask to calculate an orientation of each roof face of the roof;

snapping the orientation of each roof face to a grid;

using the roof mask to obtain an extent of the roof; and cropping the image so that the roof is centered in the image and axis-aligned to the grid.

13. The system of claim 12, wherein aligning the image and DSM further comprises:

predicting, using semantic segmentation, the roof, trees and background in the image and DSM; and cross-correlating the image and DSM to determine a location that aligns the image and DSM.

14. The system of claim 13, wherein semantic segmentation is applied separately to the image and DSM.

15. The system of claim 12, wherein aligning the image and DSM further comprises:

feeding the image and DSM into a neural network that is trained to predict numerical offsets between two images; and aligning the image and DSM using the predicted numerical offsets.

16. The system of claim 11, the operations further comprising:

obtaining, using a graphical user interface (GUI), the input address.

17. The system of claim 11, the operations further comprising:

detecting, using instance segmentation, roof top obstructions; and using the 3D roof model and the detected roof top obstructions to determine a useable area of the roof.

18. The system of claim 17, the operations further comprising:

determining, a location in the useable area of the roof to install solar panels based on output of a shading model; and calculating a number and size of solar panels needed to cover the location.

19. The system of claim 18, the operations further comprising:

estimating an output power of the solar panels; and estimating one or more cost savings metrics based on the number and the size of the solar panels, the output power of the solar panels and an average energy cost for the structure.

20. The system of claim 19, the operations further comprising:

displaying, using a graphical user interface (GUI), the one or more cost savings metrics and the estimated power output.

* * * * *